US012387243B2

(12) United States Patent
Santorello et al.

(10) Patent No.: US 12,387,243 B2
(45) Date of Patent: *Aug. 12, 2025

(54) SYSTEMS AND METHODS FOR CUSTOMER-PERSONALIZED VIDEOS

(71) Applicant: Insight Direct USA, Inc., Chandler, AZ (US)

(72) Inventors: Noah Santorello, Bronx, NY (US); Ilya Eliashevsky, Milford, CT (US); Taylor Shelgren, Georgetown, TX (US)

(73) Assignee: Insight Direct USA, Inc., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/134,963

(22) Filed: Apr. 14, 2023

(65) Prior Publication Data
US 2024/0112224 A1 Apr. 4, 2024

Related U.S. Application Data

(63) Continuation of application No. 17/957,497, filed on Sep. 30, 2022.

(51) Int. Cl.
*G06Q 30/0203* (2023.01)
*G06F 16/78* (2019.01)
(Continued)

(52) U.S. Cl.
CPC ..... *G06Q 30/0276* (2013.01); *G06F 16/7867* (2019.01); *G06Q 30/0203* (2013.01);
(Continued)

(58) Field of Classification Search
CPC .......... G06Q 30/0276; G06Q 30/0203; G06Q 30/0253; G06Q 30/0255; G06Q 30/0269
See application file for complete search history.

(56) References Cited

U.S. PATENT DOCUMENTS 5,724,571 A * 3/1998 Woods ............. G06F 16/24578
707/999.005
7,065,499 B1 6/2006 Seth et al.
(Continued)

FOREIGN PATENT DOCUMENTS

AU       2012201826 A1    4/2012
CN        113065027 A     7/2021
(Continued)

*Primary Examiner* — Azam A Ansari
(74) *Attorney, Agent, or Firm* — Kinney & Lange, P.A.

(57) ABSTRACT

A method of creating custom video sequences includes presenting an ecommerce website to a customer and automatically collecting electronic customer data from the ecommerce website by a server system. The electronic customer data describes at least one customer interaction with the ecommerce website is automatically collected concurrently with customer interaction(s). The method further includes, concurrently with automatically collecting the electronic customer data, creating a customer profile of a customer based on the electronic customer data, determining a set of offering descriptors based on at least one customer descriptor, automatically selecting a subset of video segments from a plurality of video segments based on the set of offering descriptors, and automatically sequencing the subset of video segments into a custom video. The method further includes automatically modifying a web page of the ecommerce website by inserting the custom video into the web page.

18 Claims, 8 Drawing Sheets

(51) Int. Cl.
  *G06Q 30/0241* (2023.01)
  *G06Q 30/0251* (2023.01)
(52) U.S. Cl.
  CPC ..... *G06Q 30/0253* (2013.01); *G06Q 30/0255* (2013.01); *G06Q 30/0269* (2013.01)

(56) References Cited

U.S. PATENT DOCUMENTS

| | | | |
|---|---|---|---|
| 7,181,438 B1* | 2/2007 | Szabo | G06Q 30/0269 705/14.27 |
| 8,108,260 B2 | 1/2012 | Maguire et al. | |
| 8,219,560 B2 | 7/2012 | Abhyankar et al. | |
| 8,271,507 B2 | 9/2012 | Farmer | |
| 8,498,906 B2 | 7/2013 | Zmolek | |
| 8,930,392 B1 | 1/2015 | Leichter | |
| 9,247,182 B2 | 1/2016 | Barnea et al. | |
| 9,357,277 B1 | 5/2016 | Nijim et al. | |
| 9,405,775 B1 | 8/2016 | Sarukkai et al. | |
| 9,460,463 B2 | 10/2016 | Wang | |
| 9,560,399 B2 | 1/2017 | Kaya et al. | |
| 9,613,371 B2 | 4/2017 | Subramanya et al. | |
| 9,659,318 B2 | 5/2017 | Tuflija et al. | |
| 9,792,332 B2 | 10/2017 | Spiegel | |
| 10,116,756 B2 | 10/2018 | Shah et al. | |
| 10,158,901 B2* | 12/2018 | Steinberg | H04N 21/23424 |
| 10,430,661 B2 | 10/2019 | Hu et al. | |
| 10,452,707 B2 | 10/2019 | Morate et al. | |
| 10,650,327 B2 | 5/2020 | Kensel et al. | |
| 10,771,867 B1 | 9/2020 | Chemolosov | |
| 10,817,522 B1 | 10/2020 | Geva et al. | |
| 11,004,217 B2 | 5/2021 | Yu et al. | |
| 11,100,554 B1 | 8/2021 | Gupta et al. | |
| 11,222,667 B2 | 1/2022 | Ratias | |
| 11,238,287 B2 | 2/2022 | Ambrozic et al. | |
| 11,270,337 B2 | 3/2022 | Kiladis et al. | |
| 2006/0122901 A1 | 6/2006 | Kawabata | |
| 2007/0203899 A1 | 8/2007 | De et al. | |
| 2008/0208716 A1 | 8/2008 | Grove et al. | |
| 2010/0010897 A1 | 1/2010 | Tyler | |
| 2011/0270813 A1 | 11/2011 | Cok et al. | |
| 2012/0226698 A1 | 9/2012 | Silvestre et al. | |
| 2013/0218880 A1 | 8/2013 | McConnell et al. | |
| 2013/0268317 A1 | 10/2013 | Mattila | |
| 2014/0040760 A1* | 2/2014 | Randell | G06F 16/435 463/43 |
| 2014/0089134 A1 | 3/2014 | Linh et al. | |
| 2014/0214617 A1 | 7/2014 | Plouffe et al. | |
| 2016/0098778 A1 | 4/2016 | Blumenthal et al. | |
| 2016/0241997 A1 | 8/2016 | Lucas | |
| 2017/0011419 A1 | 1/2017 | Cai et al. | |
| 2017/0011450 A1 | 1/2017 | Frager et al. | |
| 2017/0039578 A1 | 2/2017 | Woddi et al. | |
| 2017/0169715 A1 | 6/2017 | Alyuz Civitci et al. | |
| 2017/0270577 A1 | 9/2017 | Fazal Mahamood et al. | |
| 2018/0285883 A1 | 10/2018 | Tenorio | |
| 2019/0385208 A1 | 12/2019 | Warren et al. | |
| 2020/0202408 A1 | 6/2020 | Raviv et al. | |
| 2021/0042351 A1 | 2/2021 | Moore et al. | |
| 2021/0110203 A1 | 4/2021 | Cope | |
| 2021/0241341 A1 | 8/2021 | Sharnagat et al. | |
| 2021/0264311 A1 | 8/2021 | Mukherjee | |
| 2021/0312531 A1 | 10/2021 | Mcginnis et al. | |
| 2021/0397847 A1 | 12/2021 | Jayaram et al. | |
| 2021/0406986 A1 | 12/2021 | Sivan et al. | |
| 2022/0076098 A1* | 3/2022 | Wilson | H04L 67/04 |
| 2022/0130013 A1 | 4/2022 | Pottorff et al. | |
| 2022/0269935 A1 | 8/2022 | Arivazhagan et al. | |

FOREIGN PATENT DOCUMENTS

| | | |
|---|---|---|
| CN | 113365147 B | 11/2021 |
| EP | 1093603 A2 | 4/2001 |
| EP | 1126392 A3 | 10/2001 |
| EP | 1139262 A3 | 8/2002 |
| WO | 2001044992 A9 | 8/2002 |
| WO | 2003023663 A8 | 11/2003 |
| WO | 2015044706 A1 | 4/2015 |
| WO | 2020068118 A1 | 4/2020 |
| WO | 2022115236 A1 | 6/2022 |

* cited by examiner

SYSTEMS AND METHODS FOR CUSTOMER-PERSONALIZED VIDEOS

CROSS-REFERENCE TO RELATED APPLICATION(S)

This application is a continuation of U.S. application Ser. No. 17/957,497, filed Sep. 30, 2022, and entitled "SYSTEMS AND METHODS FOR CUSTOMER-PERSONALIZED VIDEOS," the disclosure of which is hereby incorporated by reference in its entirety.

BACKGROUND

The present disclosure relates to ecommerce and, more particularly, systems and electronic methods for automatically modifying ecommerce websites to include personalized content.

Ecommerce websites can include a large variety of offerings, such as products and/or services. Where an ecommerce website includes a large number of offerings, it can be difficult for customers browsing the ecommerce website to find products and/or services that are relevant to them, which can result in a decreased volume of sales on the ecommerce website. The creation of personalized, relevant offerings and promotional content for a customer browsing the ecommerce website can require significant computational resources. Further, the process of manually sorting and categorizing a large inventory of offerings can be significantly labor-intensive.

SUMMARY

According to one aspect of the present disclosure, a method of creating custom video sequences includes presenting an ecommerce website to a customer and automatically collecting electronic customer data from the ecommerce website by a server system. The electronic customer data describes at least one customer interaction with the ecommerce website and is automatically collected concurrently with the customer interaction(s). The method further includes, concurrently with automatically collecting the electronic customer data, the steps of creating a customer profile of a customer based on the electronic customer data, determining a set of offering descriptors based on at least one customer descriptor, automatically selecting a subset of video segments from a plurality of video segments based on the set of offering descriptors, and automatically sequencing the subset of video segments into a custom video. The customer profile includes the customer descriptor(s). The method further includes automatically modifying a web page of the ecommerce website by inserting the custom video into the web page.

According to a further aspect of the present disclosure, a system for creating custom video sequences includes a web server, an ecommerce website hosted by the webserver, and an application server in electronic communication with the webserver. The application server comprises a processor and memory. The memory is encoded with instructions that, when executed, cause the processor to automatically collect electronic customer data from the ecommerce website. The electronic customer data describes at least one customer interaction with the ecommerce website and is automatically collected concurrently with the at least one customer interaction. The instructions, when executed, further cause the processor to, concurrently with the automatic collection of the electronic customer data, create a customer profile of the customer based on the electronic customer data, determine a set of offering descriptors based on at least one customer descriptor, automatically select a subset of video segments of a plurality of video segments based on the set of offering descriptors, and automatically sequence the subset of video segments into a custom video. The customer profile comprises the at least one customer descriptor. The instructions, when executed, further cause the processor to automatically modify a web page of the ecommerce website by inserting the custom video into the web page.

DETAILED DESCRIPTION

The present disclosure relates to systems and method for determining customer preferences according to a descriptor taxonomy. As will be described in more detail subsequently, the systems and methods disclosed herein can be used to create a digital profile of a customer browsing an ecommerce website automatically and concurrently with the browsing activity. The systems and methods disclosed herein can also be used to create a set of descriptors describing products and/or services that the customer may be interested in purchasing automatically and concurrently with the browsing activity. The set of descriptors can be used to, for example, create custom product and/or service recommendations. The set of descriptors can also be used to create a custom video promoting products and/or services for sale on the ecommerce website from a pre-recorded library of video segments. The custom product and/or service recommendations and the custom video can be delivered to the customer in real-time or in substantially real-time, such that the promotional content and/or offering recommendations the customer receives can be updated in real-time or in substantially real-time as the customer continues to browse the ecommerce website.

The descriptor taxonomies disclosed herein provide an organizational method for relating services and/or products offered for sale on an ecommerce website according to the attributes of those services and/or products described by the descriptors. The descriptor taxonomies described herein reduce the computational load required to create custom product and/or service recommendations from a large inventory of products and/or services. Further, the descriptor taxonomies described herein reduce the computational load required to create custom promotional videos describing products and/or services that a customer is likely interested in purchasing.

By using a descriptor taxonomy, the systems and methods disclosed herein allow for rapid creation of personalized web page content for each customer visiting and browsing and ecommerce website. The personalized web page content can be created concurrently with the customer's browsing of the ecommerce website. Existing methods that do not use a descriptor taxonomy produce are less effective at predicting products and/or services that a customer may be interested in purchasing and require significantly more computational load to create personalized web page content.

Further, the use of a descriptor taxonomy can significantly reduce the overall labor, including both computational load and human labor, required to identify related products and/or services in a large inventory of products and/or services. As will be explained in more detail subsequently, the organizational structure of the taxonomy can be used to relate products, reducing or eliminating the need to manually associate related products.

Figure 1:
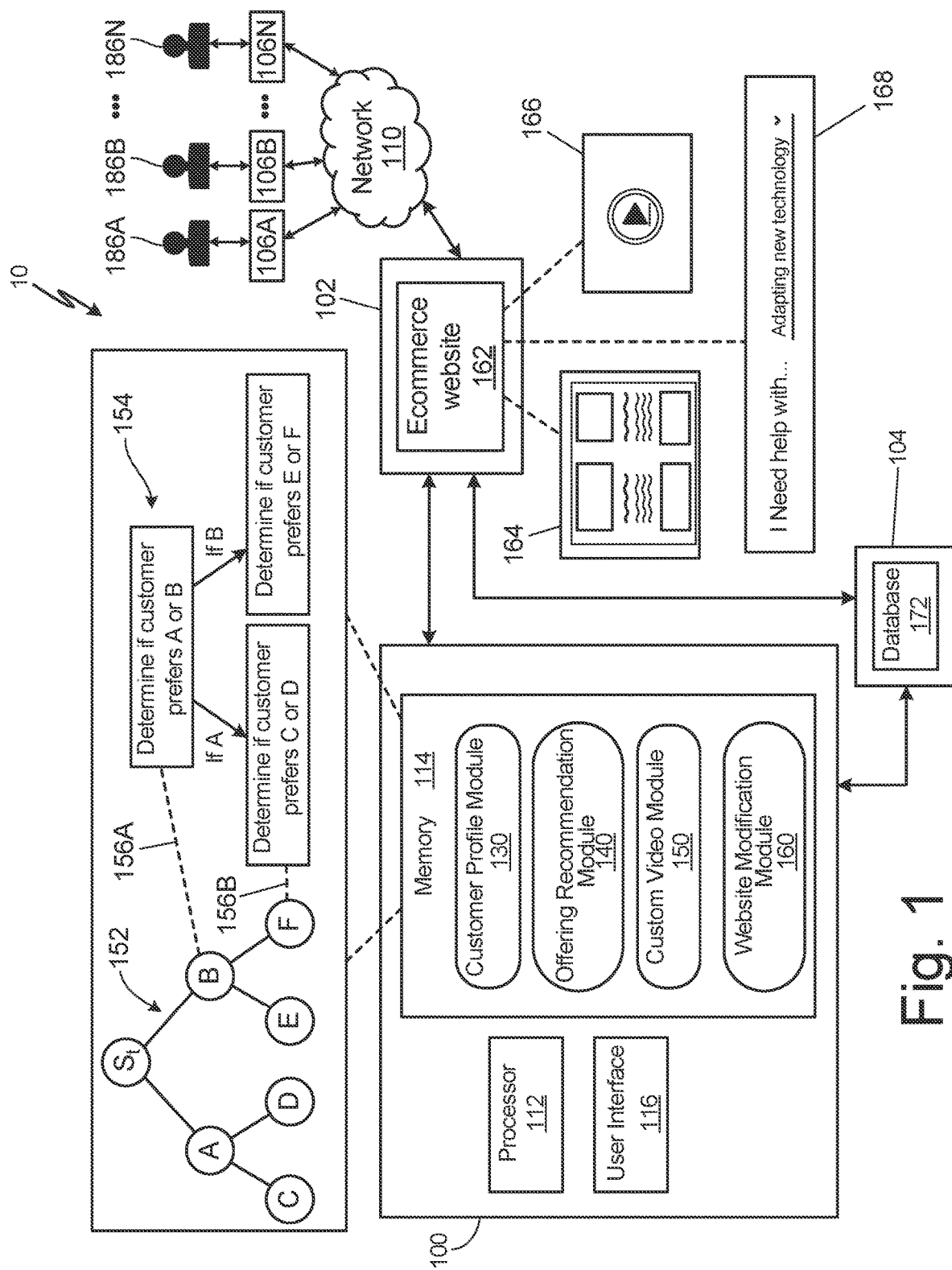
FIG. 1 is a schematic diagram of an example of a web computer system for generating custom offering information.

FIG. 1 is a schematic diagram of server system 10, which is a system for generating custom offering information. Server system 10 includes application server 100, web server 102, and database server 104. In the illustrated embodiment, web server 102 is communicatively connected to user devices 106A-N via network 110. Application server 100 includes processor 112, memory 114, and user interface 116. Memory 114 contains customer profile module 130, offering recommendation module 140, and custom video module 150. Memory 114 also contains descriptor taxonomy 152 and profiling criteria 154, which are depicted adjacent to dotted lines 156A and 156B in FIG. 1. Web server 102 includes ecommerce website 162, which includes custom offering recommendations 164, custom video 166, and preference questionnaire 168. Database server 104 includes database 172. User devices 106A-N are operated by customers 186A-N.

Application server 100 includes processor 112, memory 114, and user interface 116, and is configured to run one or more programs for performing one or more methods described herein. Processor 112 of application server 100 is configured to run programs, applications, and/or executable software stored on memory 114. Application server 100 is connected to web server 102 and database server 104, such that processor 112 is able to request data from and/or cause data to be transmitted to web server 102 and/or database server 104. Processor 112 can include one or more of a microprocessor, a controller, a digital signal processor (DSP), an application specific integrated circuit (ASIC), a field-programmable gate array (FPGA), or other equivalent discrete or integrated logic circuitry. Processor 112 can be entirely or partially mounted on one or more boards. Processor 112 can be of any type suitable for operating in accordance with the techniques described herein. In some examples, process or 112 can be implemented as a plurality of discrete circuitry subassemblies.

Memory 114, sometimes referred to as computer-readable storage media, is a machine-readable data storage medium or collection of media configured to store information. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 114 is a temporary memory. As used herein, a temporary memory refers to a memory having a primary purpose that is not long-term storage. Memory 114, in some examples, is described as volatile memory. As used herein, a volatile memory refers to a memory that that the memory does not maintain stored contents when power to the memory 114 is turned off. Examples of volatile memories can include random access memories (RAM), dynamic random access memories (DRAM), static random access memories (SRAM), and other forms of volatile memories. In some examples, memory 114 is used to store program instructions for execution by processor 112. Memory 114, in one example, is used by software or applications running on application server 100 (e.g., by a computer-implemented machine learning model or a data processing module) to temporarily store information during program execution.

Memory 114, in some examples, also includes one or more computer-readable storage media. Memory 114 can be configured to store larger amounts of information than volatile memory. Memory 114 can further be configured for long-term storage of information. For example, memory 114 can be configured to store application data and/or database data. In some examples, memory 114 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 116 is an input and/or output device and enables an operator to control operation of application server 100. For example, user interface 116 can be configured to receive inputs from an operator and/or provide outputs regarding predicted individual mental state. User interface 116 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Web server 102 is a web host connected to network 110 that hosts ecommerce website 162. Web server 102 is capable of transmitting information to and requesting information from application server 100 and/or database server 104. In some examples, web server 102 is a hardware server and includes a processor, memory, and/or a user interface. The processor, memory, and/or user interface can be substantially the same as processor 112, memory 114, and user interface 116 described previously. Additionally and/or alternatively, web server 102 can be a virtual server implemented on a separate hardware device. For example, web server 102 can be implemented on the hardware of application server 100. Webserver 102 is accessible to user devices 106A-N via network 110. When a customer 186A-N operates user devices 106A-N to connect to web server 102, web server 102 can present one or more web pages of ecommerce website to the customer 186A-N by transmitting data from ecommerce website 162 to the customer's user device 106A-N.

Database server 104 is a database server for storage data in one or more databases. In FIG. 1, database server 104 is depicted as including database 172, which is a database for organizing and storing offering information. Programs running on application server 100 and/or web server 102 can access and/or query information stored on database 172. In some examples, database server 104 is a hardware server and includes a processor, memory, and/or a user interface. The processor, memory, and/or user interface can be substantially the same as processor 112, memory 114, and user interface 116 described previously. Additionally and/or alternatively, database server 104 can be a virtual server implemented on a separate hardware device. For example, database server 104 can be implemented on the hardware of application server 100. In some examples, both web server 102 and database server 104 are implemented on the hardware of application server 100.

Database server 104 includes machine-readable data storage capable of retrievably housing stored data, such as database or application data. The machine-readable data storage can be non-volatile memory or another non-volatile storage media. For example, non-volatile storage media can include magnetic hard discs, optical discs, flash memories and other forms of solid-state memory, and/or forms of electrically programmable memories (EPROM) or electrically erasable and programmable (EEPROM) memories.

User devices 106A-N are computing devices connected to network 110 and can include a processor, memory, and/or a user interface. The processor, memory, and/or user interface can be substantially the same as processor 112, memory 114, and user interface 116 described previously. User devices 106A-N can also be virtual devices implemented on another hardware device. User devices 106A-N are capable of receiving inputs from customers 186A-N and transmitting those inputs to web server 102 via network 110 in order to enable customers 186A-N to browse ecommerce website 162.

Network 110 is an electronic communication network for communicatively coupling user devices 106A-N to webserver 102. Network 110 allows customers 186A-N to access ecommerce website 162 via user devices 106A-N. Network 110 can be, for example, the internet or another suitable multi-device network.

Ecommerce website 162 is a website for performing one or more ecommerce transactions. Ecommerce website 162 includes one or more web pages and is configured to transmit data to user devices 106A-N based on one or more requests made by user devices 106A-N. Customers 186A-N can use user devices 106A-N to browse ecommerce website 162 and purchase one or more products and/or services offered for sale on ecommerce website 162. As used herein, a "offering" refers to one or more products and/or services offered for sale. The total group of offerings offered for sale on ecommerce website 162 is referred to herein as an "inventory" of offerings. The web pages of ecommerce website 162 are configured to allow a customer 186A-N to, for example, make purchases, obtain offering recommendations, and/or request information that describes offerings available for purchase on ecommerce website 162, among other options.

Offering descriptors describing aspects of the offerings of the inventory of offerings can be created and organized into descriptor taxonomy 152, described subsequently. The offering descriptors are selected to describe various aspects of the offerings or categories to which the offerings belong, such that all offerings offered for sale can be adequately described by a combination of offering descriptors. Generally, the number of available offering descriptors is smaller than the overall number of available offerings. For example, 200 offerings may be adequately described by five categories of offering descriptors. Each category may include, for example, between two and four offering descriptors, such that between 10 and 20 offering descriptors are able to describe all 200 offerings. The above example is provided for explanatory purposes, and in other examples the total number of offerings may be adequately described by another number of categories and/or offering descriptors.

Database 172 is an electronic database and is stored on storage of database server 104. Database 172 organizes related data such that a processor (e.g., processor 112) can query database 172 to retrieve values stored in database 172. For example, database 172 can organize related offering descriptors and offerings, such that querying database 172 with one or more offering descriptors retrieves offerings related to the queried offering descriptors.

Data stored in database 172 is organized according to a database management system. As used herein, a "database management system" refers to a system of organizing and/or managing data stored on a data storage medium. In some examples, a database management system described herein is configured to run operations on data stored on the data storage medium. The operations can be requested by a user and/or by another application, program, and/or software. The data stored on the machine-readable data storage of database server 104 can be structured or unstructured as required by the database management system used to manage the data.

Customer profile module 130 includes one or more programs stored to memory 114 for generating a customer profile. A customer profile is a digital profile that describes offerings that a customer may be interested in based on one or more attributes of the customer. The customer can be, for example, one of customers 186A-N (e.g., a user shopping on their own behalf). In other examples, customers 186A-N are buyers interacting with ecommerce website 162 to shop on behalf of a purchasing entity (e.g., a buyer shopping on behalf of a large entity). Customer profile module 130 can execute one or more programs to, for example, analyze activity of customers 186A-N interacting with ecommerce website 162 to determine customer attributes. Additionally and/or alternatively, customer profile module 130 can create a questionnaire of one or more questions that can be answered by one or more of customers 186A-N to determine customer attributes. Ecommerce website 162 can pose questions of the questionnaire to customers 186A-N interacting with ecommerce website 162. Customer profile module 130 can use, for example, customer profiling criteria 154, explained in more detail subsequently, to determine which attributes should be included in a customer profile.

Customer profile module 130 can automatically collect electronic customer data of customer activity on ecommerce website 162. The electronic customer data can describe, for example, a customer's browsing history on ecommerce website 162. The electronic customer data can also describe, for example, a customer's answers to a questionnaire hosted on ecommerce website 162. The questionnaire can be designed to determine customer preferences. The electronic customer data can include first-order data reflective of a customer's activity on ecommerce website 162 and/or metadata of the first-order data. Processor 112 can generate metadata from data stored to memory 114 and store the metadata 114 for use with the creation of a customer profile. First-order data may describe, for example, the contents of a webpage visited by the customer, while metadata may describe, for example, the frequency with which a customer visits a given webpage of ecommerce website 162.

The electronic customer data collected by customer profile module 130 can be used to create one or more customer descriptors that describe and categorize a customer's interests and/or preferences. Customer profile module 130 can select the one or more customer descriptors from a predetermined pool of customer descriptors based on the collected electronic customer data and can store those customer descriptors to a customer profile.

Offering recommendation module 140 includes one or more programs for creating a custom set of offerings. The custom set of offerings are recommendations of offerings sold on ecommerce website 162 that a customer is likely to be interested in based on their customer profile. Offering recommendation module 140 can generate a custom set of recommended offerings based on the customer profile generated by customer profile module 130. In some examples, offering recommendation module 140 can use a descriptor taxonomy, such as descriptor taxonomy 152, to generate a custom set of offerings for a customer. In some examples, offering recommendation module 140 uses the customer profile and descriptor taxonomy 152 to determine offering descriptors pertaining to offerings the customer may be interested in. Offering recommendation module 140 can then query database 172 of database server 104 to determine what offerings correspond to those offering descriptors and provide those offerings to website modification module 160. As will be described subsequently, website modification module 160 can modify a web page of ecommerce website 162 that the customer is browsing to cause the web page to display the custom set of offerings.

Custom video module 150 includes one or more programs for creating a custom video for a customer. The custom video can include one or more video sequences that relate to offerings that the customer may be interested in. Custom video module 150 can use the customer profile created by customer profile module 130 and/or offering descriptors created by offering recommendation module 140 to select video sequences that should be included in the custom video. The custom video can then be output to the customer via, for example, ecommerce website 162. The video sequences of the custom video can alert the customer to and inform the customer about various offerings available for purchase on ecommerce website 162. The video sequences can be predetermined and pre-generated video sequences describing and/or targeting offerings having one or more common offering descriptors. The video sequences can include one or more of a testimonial, a demonstration, an offering description, or a case study involving the offering, among other options.

Website modification module 160 includes one or more programs for modifying web pages and web page content of ecommerce website 162 that is transmitted to user devices 106A-N. Website modification module 160 can automatically update web page information delivered to user devices 106A-N based on the custom set of offerings created by offering recommendation module 140 and/or custom video module 150. Website modification module 160 can, for example, modify a web page of ecommerce website 162 to display the custom offerings generated by offering recommendation module 140 instead of a default set of generic offerings. Website modification module 160 can also modify a web page of ecommerce website 162 by inserting a custom video created by custom video module 150. Website modification module 160 can insert a custom video by inserting the entire custom video into the webpage, inserting a pointer to the custom video into the web page, and/or by inserting pointers to all video sequences used to create the custom video as well as code that can be used to order the video sequences into the custom video, among other options.

Descriptor taxonomy 152 is stored on memory 114 and organizes offering descriptors in a hierarchical taxonomy having multiple, hierarchical layers of nodes. In the depicted example, descriptor taxonomy 152 includes nodes labeled $S_t$, A, B, C, D, E, and F. Nodes labeled A-F corresponds to offering descriptors and node S t corresponds to a starting node for using descriptor taxonomy 152 to determine a custom set of offerings and/or to create a custom video with offering recommendation module 140 and/or custom video module 150, respectively. Node S t is in the zero-level layer of descriptor taxonomy 152, nodes A and B are in the first layer of descriptor taxonomy 152, and nodes C-F are in the second layer of descriptor taxonomy 152. Descriptor taxonomies are described in greater detail below with reference to the examples provided in FIG. 2.

Each of the offering descriptors organized by descriptor taxonomy 152 corresponds to one more customer descriptors that can be stored to a customer profile by customer profile module 130. Descriptor taxonomy 152 can be encoded on memory 114 such that processor 112 can determine offering descriptors that correspond to customer descriptors of the customer in a hierarchical manner. Starting at node $S_t$, processor 112 can determine whether one of the customer descriptors of the customer profile corresponds to the offering descriptor of either node A or node B. If one of the customer descriptors corresponds to the offering descriptor of node A, processor 112 can then examine whether there is another customer descriptor that corresponds to one of nodes C or D. Similarly, if one of the customer descriptors corresponds to the offering descriptor of node B, processor 112 can then examine whether there is another customer descriptor that corresponds to one of nodes E or F. If the customer profile does not include a customer descriptor that corresponds to nodes A or B, processor 112 can examine whether one of the customer descriptors corresponds to C, D, E, or F. The process of searching from a zero-level root node (e.g., starting node S t) to a terminal layer of child nodes (e.g., the layer of nodes C-F) is referred to herein as searching a descriptor taxonomy in a "downward" manner. Processor 112 can query database 172 with all offering descriptors matched to customer descriptors in this manner to create a custom set of offerings. As will be explained in more detail subsequently, processor 112 can also use the offering descriptors of parent and child nodes of matched nodes of descriptor taxonomy 162 to query database 172.

All child nodes of a common parent node within the same layer of descriptor taxonomy 152 correspond to one category for describing the offerings available on ecommerce website 162. In examples where a category applies to all goods, it may be appropriate for all nodes of a single layer to correspond to that category. In examples where a category only applies to a subset of goods, it may be appropriate for only certain nodes having a common parent node to correspond to one category for characterizing goods. Referring to descriptor taxonomy 152, a single category may apply to all of nodes C-F, or nodes C-D and E-F may represent different categories for characterizing goods. As a specific example, depending on the structure of descriptor taxonomy 152 and the types of goods included in the inventory of ecommerce website 162, all of nodes C-F may describe different subgroups of offerings within the category of business need. In another example, node A may correspond to hardware offerings while node B corresponds to software offerings. In this example, nodes C-D can describe a hardware product's wireless capabilities while nodes E-F describe a software product's operating system compatibility. The above examples are non-limiting and are provided to illustrate the inventory-specific manner in which a descriptor taxonomy 152 can be organized.

Each node within a given hierarchical layer corresponds to one option within a given organizational category, where each option describes a property of an offering and/or a customer preference, interest, and/or need. Descriptor taxonomy 152 can be constructed by analyzing the offerings offered on ecommerce web site 162 to determine the desired organizational categories and options within each category.

For example, a customer may have preferences regarding technology type, business need, relative experience in a given field and/or with a given technology, and brand based on the needs, interests, and/or preferences of that customer. Descriptor taxonomy can then be constructed to have four hierarchical layers of offering descriptors (i.e., four layers of nodes lower than node S e), corresponding to each category (i.e., one for each of technology type, business need, relative experience, and brand). Using the brand category as a further example, each node within the brand layer of the hierarchical taxonomy can correspond to a different brand option among the offerings available for purchase on ecommerce website 162. Similarly, using the relative experience category as another example, each node within the relative experience layer of the hierarchical taxonomy can correspond to a different level of customer experience with a given product line and/or in a given technological field. In this manner, descriptor taxonomy can incorporate and organize descriptors relating both to properties of services offerings (e.g., brand) and customer preferences, interests, and/or needs (e.g., relative experience).

Descriptor taxonomy 152 is depicted in FIG. 1 as including only two hierarchical layers of offering descriptors for explanatory purposes and to improve clarity. In other examples, descriptor taxonomy 152 can include more than two hierarchical layers. Further, each parent node of descriptor taxonomy 152 is depicted in FIG. 1 as including only two child nodes for explanatory purposes and to improve clarity. In other examples, nodes of descriptor taxonomy 152 can have more than two child nodes or fewer than two child nodes, and can also have different numbers of child nodes.

Having different numbers of child nodes for different parent nodes can be useful where, for example, ecommerce website 162 includes offerings that are specialized and/or biased toward a particular customer interest, need, and/or preference. Using technology type and business need as explanatory examples of customer preference, the offerings of ecommerce website 162 may meet a wider variety of business needs for particular technology types, such that a larger number of offering descriptors is required to accurately describe all business needs met by the offerings that belong to those technology types. In this example, descriptor taxonomy 152 can be organized such that technology type can be placed one level of descriptor taxonomy 152 higher than business needs. Technology types having offerings that that meet a larger variety of business needs will have a commensurately larger number of child nodes in the business need layer of the hierarchical descriptor taxonomy.

The use of a hierarchical descriptor taxonomy provides numerous advantages over existing methods. Organizing offering descriptors in a hierarchical taxonomy (e.g., descriptor taxonomy 152) allows for efficient identification of offerings that are relevant to a customer, especially for ecommerce websites offering for sale a large number of offerings. Processor 112 can, in a stepwise fashion, exclude large numbers of offerings based on a customer's customer profile and include only offerings that are likely to be relevant to a customer's needs, interests, and/or preferences. Providing more relevant offerings can increase customer engagement, promote repeat purchases, and increase overall customer satisfaction.

The use of hierarchical descriptor taxonomies also significantly reduces the human labor required to determine which offerings of an inventory of offerings are related. Existing methods that do not use a descriptor taxonomy require manual association of related offering in an offering-by-offering manner in order to provide accurate relationships between offerings. Conversely, a descriptor taxonomy only requires that products be labeled with descriptors, and then that the limited number of descriptors be hierarchically arranged. In this manner, a descriptor taxonomy requires significantly less human labor to create than existing methods of organizing and associating offerings. Reducing human labor required to label and associate related offerings of an inventory can significantly reduce labor costs associated with operating an ecommerce website.

For example, a brand may have products and/or servicing within more than one class of offering, and a customer may be interested in the brand but may only be interested in one class of offering sold under the brand. Existing methods may collect data of the customer shopping for products of the brand of interest and provide recommendations for offerings outside of the class of interest, causing the customer to receive recommendations for products that they are not interested in purchasing. Manually associating offerings can into specific groupings and sub-groupings of offerings can partially improve the accuracy of product recommendations, but, as described previously, the process of manually offering association requires significant human labor. Using existing methods, a human operator must manually inspect the groupings of offerings to determine that there are two classes of good associated with the same brand and further must have the skill or experience to recognize that a customer may be interested in only one class of good. Conversely, a descriptor taxonomy can be used to organize brand as sub-nodes of each class of goods with significantly less labor and by operators with less skill or experience. Each offering for sale can be assigned descriptors for both brand and class and a descriptor taxonomy can be organized such that nodes for brand are in a child layer of the nodes for class of offering. In this example, a human operator would only be required to have the skill or experience to recognize that class of offering is likely to produce more accurate product recommendations than recommendations based on brand alone. A processor, such as processor 112, can then automatically narrow the list of recommendations first by class of good and then by brand, according to the organizational structure of the descriptor taxonomy to provide product recommendations that are tailored to a customer's interests and that include fewer, if any, unrelated offerings than existing methods. The above non-limiting examples illustrate the advantages in organizing an inventory of offerings and in determining relationships between products provided by descriptor taxonomies described herein.

Further, the use of a descriptor taxonomy can significantly reduce the human labor required to add new offerings to an ecommerce website inventory. Adding new offerings to an inventory requires new products to be manually associated to existing offering groups, which is a time-consuming process usually requiring significant human labor. A human operator is required to first determine what groupings of offerings exist, and then make a subjective decision about what group(s) the new offerings should belong to. Conversely, adding new offerings to an inventory for which there is a descriptor taxonomy only requires that the new products be labeled with descriptors of the descriptor taxonomy. Further, if the new offerings have characteristics not shared by existing products, one or more new nodes can be added to appropriate locations of the descriptor taxonomy which can then be used to automatically generate relationships between offerings. Conversely, using existing methods, a human operator is be required to subjectively determine whether the new products are similar enough to be associated with an existing product grouping and/or whether a new product grouping should be created.

Further, the use of a hierarchical taxonomy can reduce the overall number of descriptors required to describe an inventory of offerings by storing information about offering relatedness through the hierarchical structure of the taxonomy. Prior methods may, for example, require that related products be manually associated. The use of a hierarchical taxonomy requires only that the descriptors for those related products be related through the organizational structure of the taxonomy. In this manner, the use of a hierarchical taxonomy also reduces the overall workload, including both computational load and human labor, required to label related products in a large inventory of offerings.

Further, organizing offering descriptors rather than offerings significantly reduces the workload required to organize and create a hierarchical taxonomy, especially for ecommerce websites offering for sale a large number of offerings. The hierarchical structure of the taxonomy allows a limited number of offering descriptors to describe and capture all offerings of a large inventory by associating offering descriptors of related products through parent-child node relationships established by the edges of the hierarchical taxonomy.

While descriptor taxonomy 152 has been described herein as relating generally to the identification of related offerings and the creation of offering recommendations, the organizational structure of descriptor taxonomy 152 can also be used to create targeted promotional content for products a customer may be interested in. As outlined in the above-described examples, related products can be identified through the use of a descriptor taxonomy with significant more accuracy and in a significantly more efficient manner than allowed by existing methods. Promotional content for those related products can also be displayed to the customer to improve customer engagement with ecommerce website 162, potentially increasing the likelihood that the customer purchases an offering from ecommerce website 162. The promotional content can be created by, for example, one or more programs of custom video module 150.

Profiling criteria 154 are criteria for determining a customer's likely preference between different options within categories of goods. Profiling criteria 154 are structured according to the structure of descriptor taxonomy 152. Profiling criteria 154 includes two hierarchically-arranged levels of criteria for determining customer preferences. The relationship between the levels of profiling criteria 154 and descriptor taxonomy 152 is indicated by dashed lines 156A and 156B. Profiling criteria 154 indicates that the customer's preference between the offerings described by nodes A and B should be determined first, as shown by dashed line 156A. The customer's preference regarding the next level of descriptor hierarchy 152 can then be determined, as shown by dashed line 156B. Specifically, if the customer is determined to prefer the offerings described by the descriptor represented by node A, profiling criteria 154 indicates that the customer's preference between the offerings described by the descriptors represented by nodes C and D. Similarly, if the customer is determined to prefer the offerings described by the descriptor represented by node B, profiling criteria 154 indicates that the customer's preference between the offerings described by the descriptors represented by nodes E and F. Customer profile module 130 can use profiling criteria 154 to create customer descriptors for a customer profile. Customer profile module 130 can determine customer preference at each tier of profiling criteria Profiling criteria 154 are specific to a particular descriptor taxonomy 152 and are created after a descriptor taxonomy 152 has been created for the offerings sold on ecommerce website 162. Descriptor taxonomy 152 and/or profiling criteria 154 can be constructed by a human operator and stored on memory 114. Additionally and/or alternatively, descriptor taxonomy 152 and/or profiling criteria 154 can be created automatically by one or more programs stored on memory 114 and executed by processor 112.

Custom offering recommendations 164 are visually-perceptible information, such as text, icons, and/or images, that describe the custom set of offerings created by offering recommendation module 140. Custom offering recommendations 164 can also include aurally-perceptible information, such as one or more audio files. Custom offering recommendations 164 can be created and inserted into a web page of ecommerce website 162 by website modification module 160. The modified web page including custom offering recommendations 164 can be transmitted to a user device 106A-N of a customer 186A-N browsing ecommerce website 162. The customer 186A-N can then purchase one of the offerings included in custom offering recommendations 164 by interacting with ecommerce website 162.

Custom video 166 is a custom video created by custom video module 150 and viewable by a customer 186A-N browsing ecommerce website 162. Custom video 166 includes visual and/or audio elements that are perceptible by a customer interacting with ecommerce website 162. Custom video 166 can be inserted into a web page of ecommerce website 162. The modified web page including custom video 166 can be transmitted to a user device 106A-N of a customer 186A-N browsing ecommerce website. The customer 186A-N can view custom video 166 to learn more about offerings linked to the customer's profile. In some examples, the modified web page requires the customer 186A-N to interact with one or more buttons (e.g., click a web player) to view custom video 166. In other examples, the modified web page causes custom video 166 to automatically play. In at least some examples, the modified web page that includes custom video 166 is also modified to include custom offering recommendations 164. In other examples, custom video 166 and custom offering recommendations 164 are inserted into different web pages of ecommerce website 162.

Preference questionnaire 168 includes one or more questions that a customer 186A-N can answer by interacting with ecommerce website 162. The questions are designed to determine preferences according to the profiling criteria 154 for the descriptor taxonomy 152 for the offerings sold on ecommerce website 162. A customer 186A-N can answer questions of preference questionnaire 168 by interacting with ecommerce website 162. For example, preference questionnaire 168 can include one or more clickable buttons or other web page elements that a customer use to indicate a preference according to profiling criteria 154. Customer profile module 130 can use the answers to preference questionnaire 168 to create customer descriptors for a customer profile, which can then be used to create a custom set of offerings and/or a custom video by offering recommendation module 140 and/or custom video module 150, respectively.

Figure 2:
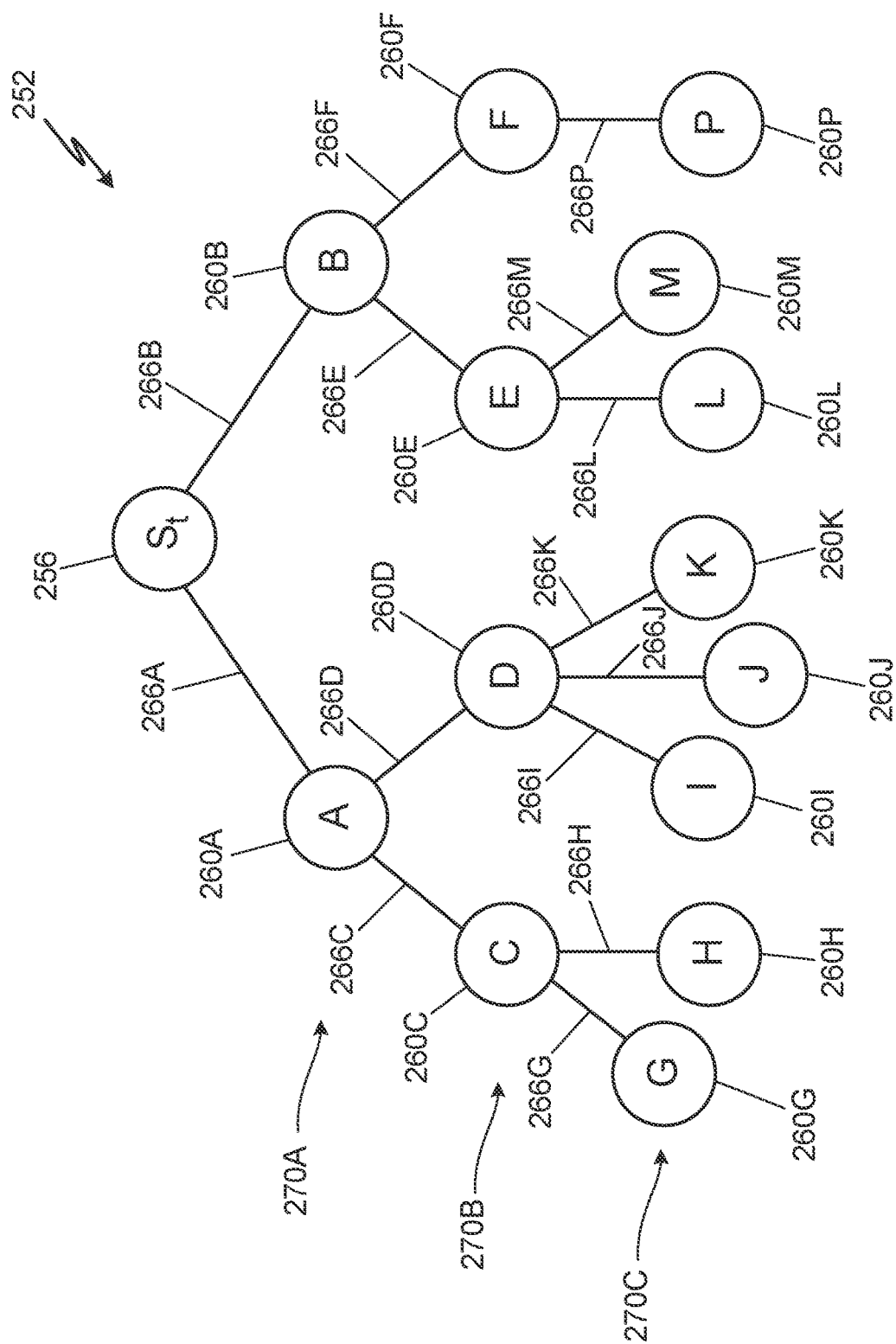
FIG. 2 is a schematic diagram of an example of a descriptor taxonomy suitable for use with the web computer system of FIG. 1.

FIG. 2 is a schematic diagram of an example of a descriptor taxonomy 252, which is similar to descriptor taxonomy 152 but includes three hierarchical layers of offering descriptors and includes nodes having varying numbers of child nodes. Like descriptor taxonomy 152, descriptor 252 is a non-limiting example and is included for explanatory purposes. Server system 10 suitable for use with the web computer system of FIG. 1. Descriptor taxonomy includes starting node 256, descriptor nodes 260A-P, and edges 266A-P organized into hierarchical layers 270A-C.

Descriptor nodes 260A-P correspond to offering descriptors that describe the inventory of offerings of an ecommerce website 162. Starting node 256 is a zero-layer node and does not correspond to any offering descriptors. Rather, starting node 256 can be used as a starting point to search sequentially through layers 270A, 270B, 270C of descriptor taxonomy 252. Edges 266A-P indicate the relationship between the nodes (i.e., staring node 256 and descriptor nodes 260A-P). Nodes 260A-P that are connected by an edge 266A-P or a continuous chain of nodes 260A-P and edges 266A-P are referred to herein as "parent nodes" or "child nodes" based on their relative position in hierarchical layers 270A-C. For example, nodes 260A and 260C are parent nodes of node 260G, and nodes 260C and 260G are child nodes of node 260A. Each group of child nodes in the same layer 270A, 270B, 270C corresponds to the same category for categorizing the offerings offered on the ecommerce website 162. Within a given lineage (i.e., a sequence of connected nodes and edges spanning layers 270A-C), different layers 270A, 270B, 270C correspond to different categories for categorizing offerings.

As described previously, in examples where a category applies to all goods, it may be appropriate for all nodes of a single layer to correspond to that category. In examples where a category only applies to a subset of goods, it may be appropriate for only certain nodes having a common parent node to correspond to one category for characterizing goods. Referring to descriptor taxonomy 252 as a specific example, each of groups of nodes 260G-H, 260I-K, 260L-M, and 260Q can correspond to a different category for characterizing goods. In other examples, all of nodes 260G-Q can correspond to the same category for characterizing goods. In yet further examples, some groups of nodes 260G-H, 260I-K, 260L-M, and 260Q can correspond to the same category for characterizing goods and others of 260G-H, 260I-K, 260L-M, and 260Q can correspond to different categories for characterizing goods. For examples, nodes 260G-H and 260I-K can correspond to a first category, nodes 260L-M can correspond to a second category, and node 260Q can correspond to a third category. The above examples are non-limiting and are provided to illustrate various ways that nodes of descriptor taxonomy 252 can be organized.

The nodes of the top hierarchical layer 270A of descriptor taxonomy 252 generally correspond to different offering descriptors. However, the same offering descriptor may occur in multiple groups of child nodes in lower hierarchical layers 270B, 270C. For example, nodes 260C and 260E can be the same offering descriptor. If, for example, layer 270A corresponds to technology type and layer 270B corresponds to business need for the child nodes of both nodes 266A and 266B, it is possible for the same business need to be met by offerings targeting different technology types. As such, both nodes 260A and 260B would have child nodes in layer 270B corresponding to the same business need.

In this example, descriptor taxonomy 252 includes three layers 270A, 270B, 270C of nodes corresponding to offering descriptors. Nodes 260A and 260B are located in the top hierarchical layer 270A and are connected to starting node 256 by edges 266A and 266B, respectively. Nodes 260C, 260D, 260E, and 260F are located in middle hierarchical layer 270B. Nodes 260C and 260D are connected to node 260A by edges 266C and 266D, respectively. Nodes 260E and 260F are connected to node 260B by edges 266E and 266F, respectively. Nodes 260G, 260H, 260I, 260J, 260K, 260L, 260M, and 260P are located in lower hierarchical layer 270C. Nodes 260G and 260H are connected to node 260C by edges 266G and 266H, respectively. Nodes 260I, 260J, 260K are connected to node 260D by edges 266I, 266J, and 266K, respectively. Nodes 260L and 260M are connected to node 260E by edges 266L and 266K, respectively. Node 260P is connected to node 260F by edge 266P.

Processor 112 inspects descriptor taxonomy 252 to identify nodes that have a descriptor that matches or corresponds to a customer descriptor in a downward manner. As described previously, searching a taxonomy in a "downward" manner refers to searching from a zero-level root node (e.g., starting node 256) to a terminal layer of child nodes (e.g., nodes 260G-Q of hierarchical layer 270C). Specifically, processor 112 first determines whether a customer descriptor matches the offering descriptor of node 260A or node 260B. Depending on the results of the comparison, processor 112 then determines whether a second customer descriptor matches the services offering descriptor of one of nodes 260C-D or one of nodes 260E-F. Depending on the results of the second comparison, processor 112 then determines whether a third customer descriptor matches the offering descriptor of one of nodes 260G-H, nodes 260I-K, nodes 260L-M, or nodes 260P-P. As a specific example, if the descriptor of node 260A matches a customer descriptor of the customer profile, processor 112 then determine whether the descriptor of node 260C or node 260D matches a customer descriptor. If the descriptor of node 260D matches a customer descriptor, processor 112 proceeds by determining whether a descriptor of nodes 260I, 260J, or 260K matches a customer descriptor.

In some examples, a customer profile can include customer descriptors that match or correspond to the offering descriptors of multiple nodes that are in the same layer 270A, 270B, 270C and are connected to the same parent node. For example, a customer profile can include customer descriptors that match or correspond to the offering descriptors of both nodes 260C and 260D. In this example, processor 112 would continue inspecting taxonomy 252 in a downward manner from both nodes 260C and 260D. Specifically, processor 112 would inspect nodes 260G, 260H and would also inspect nodes 260I, 260J, 260K for offering descriptors that correspond to or match customer descriptors of the customer profile. A customer profile can include customer descriptors that correspond to multiple available options in the same hierarchical layer 270A, 270B, 270C where the customer is open to multiple options, has multiple interests, and/or does not have a strong preference in the category represented by the hierarchical layer hierarchical layer 270A, 270B, 270C.

If processor 112 encounters a layer of descriptor taxonomy 252 having no offering descriptors that correspond to any customer descriptors of a customer profile, processor 112 can continue to search for offering descriptors that match or correspond to a customer descriptor in the children in of those nodes. For example, if the offering descriptor of node 260A corresponds to a customer descriptor, but neither of the offering descriptors of nodes 260C and 260D correspond to customer descriptors, processor 112 can then search all of nodes 260G-K. If processor 112 finds a match among those child nodes, the offering descriptors for the child node as well as the appropriate parent node can be stored in the set of offerings used to make a custom set of offerings (i.e., with one or more programs of offering recommendation module 140) and/or to make a custom video (i.e., with one or more programs of custom video module 150). If no offering descriptors in the child layer match a customer descriptor, processor 112 can proceed through subsequent child nodes (if any remain) to search for an offering descriptor that corresponds to a customer descriptor. If no further offering descriptors remain, processor 112 can store in the set of offering descriptors all offering descriptors for all child nodes of the lowest node of descriptor taxonomy 252 matched to a customer descriptor. Similarly, if processor 112 matches all customer descriptors before inspecting all layers of descriptor taxonomy 252, processor 112 can store in the set of offering descriptors all offering descriptors for all child nodes of the lowest node of descriptor taxonomy 252 matched to a customer descriptor.

Searching descriptor taxonomy 252 in a downward manner allows for the largest number of descriptors organized by descriptor taxonomy 252 to be removed from the set of offering descriptors used to generate the custom set of offerings. For example, understanding that a customer has a preference for offerings related to the descriptor placed in node A of descriptor taxonomy 252 rather than offerings related to the descriptor placed in node B allows for the descriptors in nodes 260E, 260F, 260L, 260M, and 260P to be excluded from the set of offering descriptors used to generate the custom set of offerings. Conversely, starting at the customer's preference for, for example, the offerings represented by the descriptors in nodes 260G and 260H only allows one of nodes 260G and 260H to be excluded from the set of offering descriptors used to generate the custom set of offerings.

In examples where it is advantageous to characterize offerings with more than three categories of descriptors, descriptor taxonomy 252 can include more than three hierarchically-arranged layers of nodes corresponding to offering descriptors. Similarly, if it is advantageous to have only two categories of descriptors for characterizing offerings, descriptor taxonomy 252 can be adapted to have only two hierarchically-arranged layers of nodes.

Descriptor taxonomy 252 is an example of a descriptor taxonomy for a set of offerings where some subsets of offerings have more variety and/or meeting a wider range of customer needs, interests, and/or preferences. For example, node 260D includes three child nodes, which is more than nodes 260C, 260E, and 260F. Node 260D accordingly includes a more diverse array of offerings than nodes 260C, 260E, and 260F. Similarly, node 260F includes only a single child node, meaning that node 260F includes a less diverse array of offerings than nodes 260C, 260D, or 260E. In other examples, it is possible for the nodes of descriptor taxonomy 252 to have a different arrangement, such that each of nodes 260A-F can have a different number of child nodes.

Figure 3:
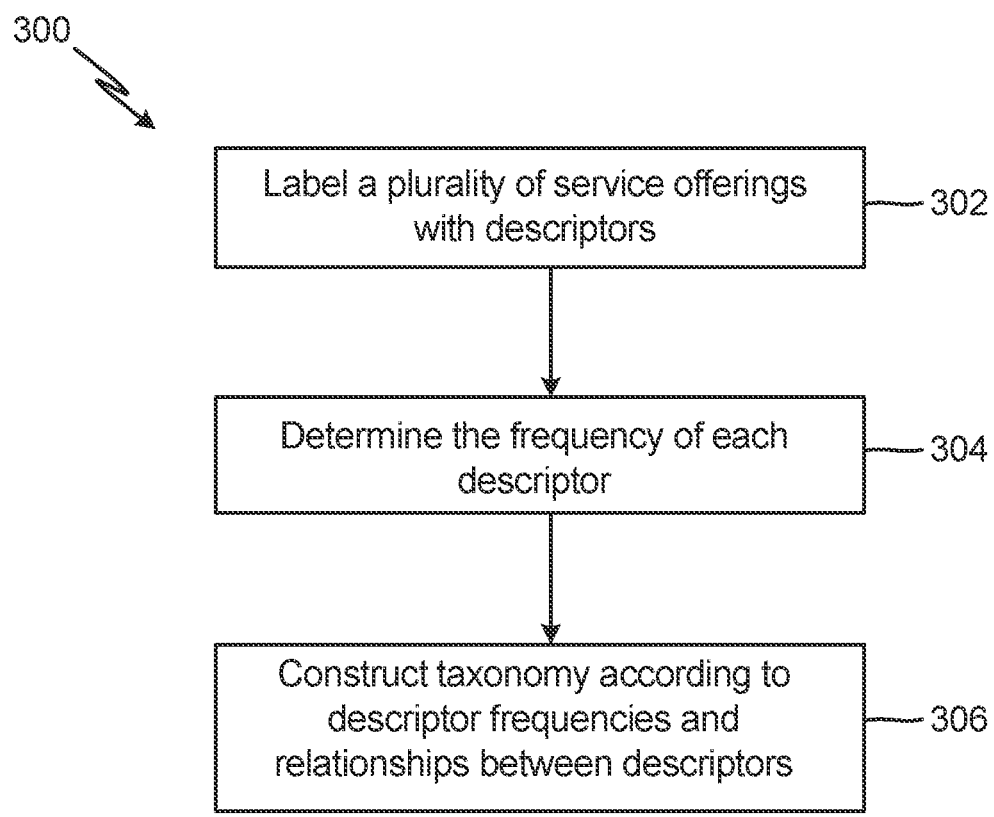
FIG. 3 is a flow diagram of an example of a method of generating a descriptor taxonomy suitable for use with the web computer system of FIG. 1 and the descriptor taxonomy of FIG. 2.

The number of child nodes and the number of hierarchically-arranged layers are determined in an inventory-specific manner, as different ecommerce websites 162 can offer different ranges of services that can be characterized using different sets of offering descriptors. FIG. 3 is a flow diagram of method 300, which is a method of creating a hierarchically-arranged descriptor taxonomy for organizing offering descriptors. Method 300 includes steps 302-306 of labeling a plurality of offerings with descriptors (step 302), determining the frequency of each descriptor (step 304), and constructing a taxonomy according to the descriptor frequencies and the relationships between descriptors (step 306). Method 300 can be used to create descriptor taxonomies 152, 252 or any other descriptor taxonomy based on a list of all offerings offered by an ecommerce website.

In step 302, a plurality of offerings is labeled with offering descriptors. Categories describing the plurality of offerings can and descriptors to distinguish offerings within each category can be created. The number of categories as well as the descriptors for each category can be determined based on the complexity of the offerings, industry norms, likely customer needs, potential customer preferences, or another business need. Once the descriptors are created, each offering can be labeled with one descriptor for each category to create a labeled set of offerings that can be used with subsequent steps of method 300. In some examples, the categories and/or descriptors can be created using one or more programs stored on memory 114 of server system 10 (FIG. 1).

In step 304, the frequency of each descriptor among the labeled set of offerings is determined. The frequency of each descriptor can be counted and used to hierarchically arrange categories of descriptors. For example, where the frequency of each descriptor of a particular category is relatively even among the total set of offerings, placing frequently-occurring descriptors in a higher layer of a descriptor taxonomy can allow for a larger number of child nodes, and thus a larger number of offering descriptors, to be excluded from subsequent analysis of the descriptor taxonomy with other customer descriptors of the customer profile. In this manner, placing higher-occurring descriptors in a higher layer of a descriptor taxonomy can significantly simplify the analysis performed by processor 112 to create a set of offering descriptors that are applicable to a customer.

In step 306, the taxonomy is constructed according to the descriptor frequencies determined in step 304 and the relationships between the descriptors to be organized in the taxonomy. Descriptors occurring more frequently can be placed as nodes in higher layers of the descriptor taxonomy, providing the advantages outlined in the discussion of step 304. However, in some examples where the frequency of each descriptor is not even among the total set of offerings, one descriptor may describe a sufficiently large portion of offerings such that placing the descriptors of that category at a high level of the descriptor taxonomy may not allow for a large number of offerings to be excluded at that level. In these examples, it may be advantageous for a category of descriptors having a more even distribution among offerings to be placed at a higher level of the descriptor taxonomy.

Based on the frequency analysis, nodes can be created that link to a starting node (e.g., starting node 256 of descriptor taxonomy 252; FIG. 2), where each node represents one offering descriptor of the same category. The next category to be included in the descriptor taxonomy can be determined based on a frequency analysis of the remaining offering descriptors. Based on the co-occurrence of descriptors of the top layer and descriptors of the second layer in labeled offerings of the labeled set of offerings created in step 302, nodes can be placed in the second layer with edges connecting the second-layer nodes to nodes in the top layer, such only descriptors assigned to a common offering of the labeled set of offerings are linked with an edge. This process can be repeated for all remaining offering descriptors to complete the descriptor taxonomy.

Method 300 is only one example of a method of creating a descriptor taxonomy and other methods can be used to create a descriptor taxonomy. In other examples, method 300 can be modified to include other optimization methods for creating an optimal descriptor taxonomy.

Figure 4:
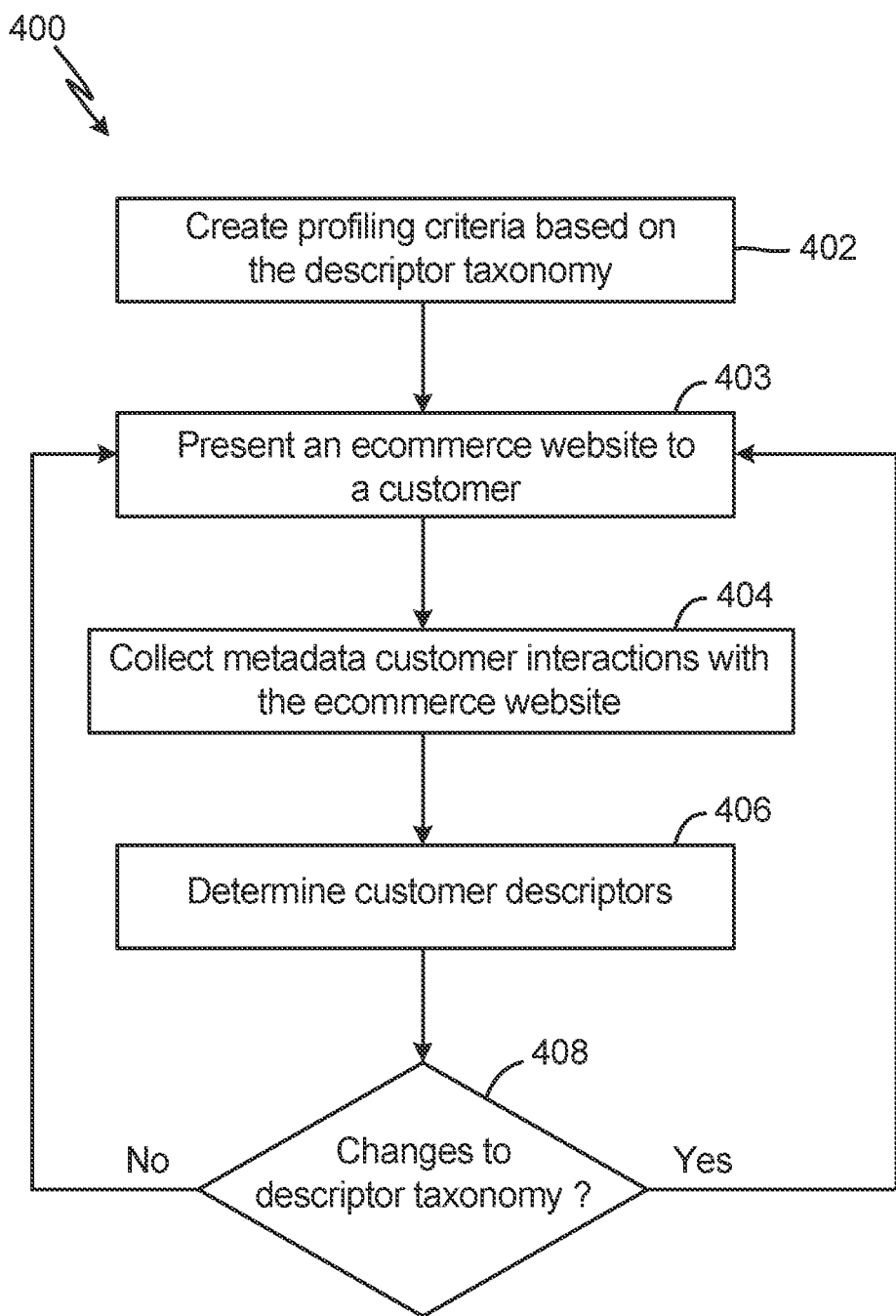
FIG. 4 is a flow diagram of an example of a method of creating a customer profile using a descriptor taxonomy suitable for use with the web computer system of FIG. 1.

FIG. 4 is a flow diagram of method 400, which is a method of creating a customer profile. Method 400 includes steps 402-406 of creating profiling criteria based on a descriptor taxonomy (step 402), presenting an ecommerce website to a customer (step 403), collecting electronic customer data of customer interactions with an ecommerce website (step 404), determining customer descriptors (step 406), and determining whether there have been changes to the descriptor taxonomy (step 408). The customer profile created using method 400 includes customer descriptors suitable for use with other methods described herein to determine a set of offering descriptors using a descriptor taxonomy.

In step 402, profiling criteria are created based on a descriptor taxonomy. The descriptor taxonomy can be, for example, descriptor taxonomy 152 (FIG. 1), descriptor taxonomy 252 (FIG. 2), a descriptor taxonomy according to method 300, or any other suitable descriptor taxonomy. As described previously, a hierarchical descriptor taxonomy organizes offering descriptors into hierarchical layers. Each layer can correspond to a category for characterizing offerings and the profiling criteria can be created to determine a customer's likely preference, interest, and/or need within a particular category. The profiling criteria can also include separate criteria for each branch point within a given hierarchical layer (e.g., profiling criteria 154 of FIG. 1).

The profiling criteria created by step 402 are designed to be able to create customer descriptors based on electronic customer data extracted from ecommerce website 162. Each criterion of the profiling criteria is selected to be able to distinguish a customer's likely preference between offerings described by descriptors in a given level of a descriptor taxonomy and/or linked to a single branch point. Electronic customer data received from ecommerce website 162 can be compared against each criterion of the profiling criteria to create customer descriptors that describe a customer's preference, interest, and/or needs at each layer and/or branch point of the descriptor taxonomy.

In at least some examples, the profiling criteria includes a questionnaire of one or more questions for determining a customer's likely preference, interest and/or need within a particular category. The questions can also be specific to each branch point within a hierarchical layer of the descriptor taxonomy. The questionnaire can be inserted into a web page of ecommerce website 162 as an interactable element, such that a customer 186A-N can answer the questions of the questionnaire by interacting with ecommerce website 162 through user device 106A-N.

Profiling criteria created in step 402, like other profiling criteria described herein, are specific to a particular descriptor taxonomy and can be used to create multiple customer profiles for multiple customers. Once step 402 is performed for a given descriptor taxonomy, step 402 can be omitted in subsequent iterations of method 400 that create a customer profile according to that descriptor taxonomy. However, if the descriptor taxonomy changes due to, for example, changes to the inventory of offerings offered on ecommerce website 162, step 402 should be repeated to create new profiling criteria for creating customer descriptors of a customer profile.

In step 403, ecommerce website 162 is presented to a customer 186A-N. As described previously, ecommerce website 162 includes one or more offerings that are available for purchase by a customer 186A-N browsing ecommerce website 162 with a user device 106A-N. The descriptor taxonomy used to generate the profiling criteria in step 402 organizes offering descriptors that describe the offerings offered on ecommerce website 162. Webserver 102 can present ecommerce website 162 to a customer 186A-N by transmitting data from ecommerce website 162 to the customer's user device 106A-N.

In step 404, electronic customer data of a customer's interactions with the ecommerce website are collected. The electronic customer data are collected by, for example, inspecting and/or analyzing the browsing history on ecommerce website 162 of a customer 186A-N. The electronic customer data can also be collected by a customer's questions to a questionnaire. The questionnaire can be, for example, preference questionnaire 168, or another suitable questionnaire. In at least some examples, the electronic customer data can be collected and associated with the customer automatically. For example, application server 100, webserver 102, or another component of server system 10 (FIG. 1) can automatically collect electronic customer data for each customer 186A-N based on an internet protocol address another suitable property of the customer's user device 106A-N. In some examples, electronic customer data for a customer can be collected over repeated visits to ecommerce website 162 based on the internet protocol address or other suitable property of the customer's user device 106A-N. Tracking a customer's activity on ecommerce website 162 over multiple visits allows for a larger sampling of electronic customer data to be used to create customer descriptors in subsequent step 406, potentially increasing the accuracy with which the customer is described by the customer descriptors.

In some examples, processor 112 can collect the electronic customer data in step 404 through the use of both a questionnaire and the passive collection of other data, such as browsing history. For example, processor 112 can use browsing history data to determine a first customer descriptor according to the profiling criteria. Processor 112 can then examine browsing history data to determine whether the data can be used to create a second customer descriptor according to the next criteria of the profiling criteria. If processor 112 cannot create the second customer descriptor, processor 112 can cause ecommerce website 162 to display a question of a questionnaire that a customer can answer to provide the information required to create the second customer descriptor. Processor 112 can repeat that process for each subsequent profiling criterion of the profiling criteria.

In step 406, customer descriptors are determined using the electronic customer data collected in step 404 and the profiling criteria created in step 402. Processor 112 can inspect and/or analyze the electronic customer data with the profiling criteria to create customer descriptors that describe the customer's interests, needs, and/or preferences according to the profiling criteria. The customer descriptors can then be stored to a customer profile. In some examples, step 406 can be performed to create new customer descriptors each time a customer visits ecommerce website 162. Additionally and/or alternatively, the customer descriptors created during step 406 can be stored to a customer profile that is associated with an internet protocol address or another suitable property of the customer's user device 106A-N. For example, the customer descriptors created based on a customer's initial interaction with ecommerce website 162 can be created and stored to the customer's profile, and then steps 403-406 can be repeated during subsequent visits to ecommerce website 162, allowing for comparison and tracking of the customer's customer descriptors through iterative adjustment over time, as new electronic customer data becomes available in real time.

Figure 5:
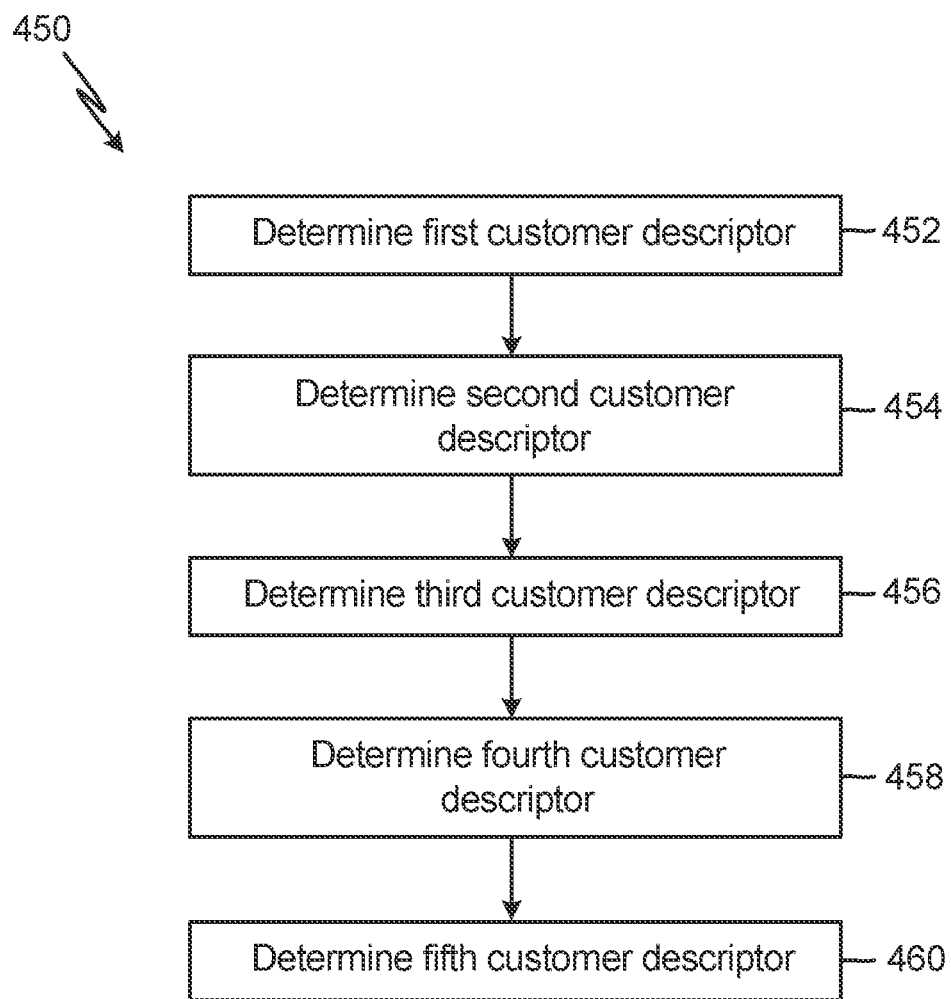
FIG. 5 is a flow diagram of an example of a method of creating customer descriptors suitable for use with the method of FIG. 4.

In examples where method 400 is only performed once, method 400 stops at step 406. If method 400 is performed iteratively to create customer profiles for multiple customers or to iteratively adjust a customer's customer descriptors, method 400 proceeds to step 408 after step 406. In step 408, processor 112 determines whether there have been changes to the descriptor taxonomy the most-recent iteration of step 406. Method 400 can be repeated by proceeding back to step 402 or 403 according to the determination made in step 408. Processor 112 can determine whether there has been a change and/or update to the descriptor taxonomy stored to memory 114. Processor 112 can inspect, for example, metadata describing a history of changes to the descriptor taxonomy to determine whether the descriptor taxonomy has been updated. If processor 112 determines that the taxonomy has been updated, method 400 proceeds to step 402 to create new profiling criteria. If processor 112 determines that the taxonomy has not been updated, method 400 proceeds to step 403 to create one or more new customer descriptors using previously-created profiling criteria.

Where profiling criteria includes more than one criterion, each criterion can be compared against the electronic customer data collected in step 404 to determine a customer descriptor for each criterion. FIG. 5 depicts method 450, which is a method of determining customer descriptors in step 406 of method 400. Method 450 includes steps 452-460 of determining a first customer descriptor (step 452), determining a second customer descriptor (step 454), determining a third customer descriptor (step 456), determining a fourth customer descriptor (step 458) and determining a fifth customer descriptor (step 460).

Method 450 allows for the creation of customer descriptors for five criteria of a set of profiling criteria created according to step 402 of method 400. Specifically, a first customer descriptor can be determined in step 452 based on a first profiling criterion and the electronic customer data, a second customer descriptor can be determined in step 454 based on a second profiling criterion and the electronic customer data, a third customer descriptor can be determined in step 456 based on a third profiling criterion and the electronic customer data, a fourth customer descriptor can be determined in step 458 based on a fourth profiling criterion and the electronic customer data, and a fifth customer descriptor can be determined in step 460 based on a fifth profiling criterion and the electronic customer data. Method 450 is depicted as including steps for creating five customer descriptors for exemplary purposes, and in other examples method 450 can be adapted to create any number of customer descriptors for any number of profiling criteria.

Step 406 of method 400 and/or all steps of method 450 can be performed automatically by server system 10 (FIG. 1) and can be performed concurrently or substantially concurrently with the collection of electronic customer data in step 404. Processor 112 or another processor of server system 10 can be used to perform step 406 and/or method 450 concurrently with step 404 of method 400. Performing steps 406 and/or method 450 concurrently with step 404 allows for the customer's customer profile to be automatically created and updated as the customer is browsing ecommerce website 162, allowing recommendations to be created using method 500 (FIG. 6; discussed in more detail subsequently) and custom videos to be created using method 600 (FIG. 8; discussed in more detail subsequently) while the customer is browsing ecommerce website 162. As such, performing step 406 and/or method 450 concurrently to the collection of electronic customer data allows for web pages of ecommerce website 162 to be updated in real-time or near real-time to improve the customer's browsing and/or shopping experience on ecommerce website 162 as the customer is browsing and/or shopping.

Figure 6:
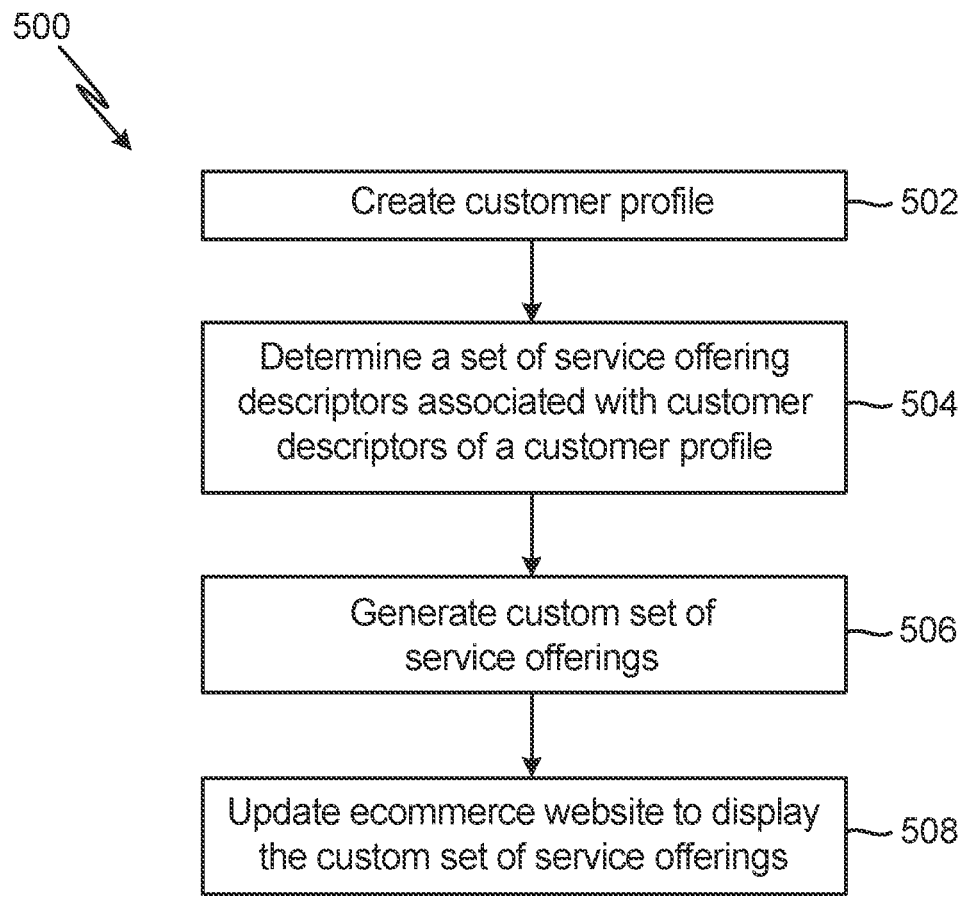
FIG. 6 is a flow diagram of an example of a method of generating relevant offerings suitable for use with the web computer system of FIG. 1.

FIG. 6 is a flow diagram of method 500, which is a method of creating a custom set of offerings based on a customer profile and a descriptor taxonomy. Method 500 includes steps 502-508 of creating a customer profile (step 502), determining a set of offerings associated with customer descriptors of the customer profile (step 504), generating a custom set of offerings (step 506), and updating the ecommerce website to display the custom set of offerings (step 508).

In step 502, a customer profile is created. The customer profile is created using profiling criteria based on the descriptor taxonomy of the offering descriptors of the inventory of offerings of ecommerce website 162. The customer profile includes at least one customer descriptor generated using the profiling criteria and electronic customer data describing customer interactions with ecommerce website 162. The customer profile can be created in step 502 by performing method 400 (FIG. 4) and, in some examples, method 450 (FIG. 5). As described with respect to methods 400 and 450, processor 112 can perform step 502 concurrently to the collection of electronic customer data in step 404 of method 400 to enable the custom set of offerings generated in step 506 to be created in real-time or substantially in real-time.

In step 504, a set of offering descriptors associated with customer descriptors of the customer profile (i.e., the customer profile created in step 502) is determined. Offering descriptors are determined using the same descriptor taxonomy used to generate profiling criteria for creating the customer profile in step 502. Processor 112 can determine offering descriptors by analyzing the descriptor taxonomy in a downward manner with the customer descriptors for the customer. More specifically, beginning at the starting node of the descriptor taxonomy, processor 112 can determine which node(s) of all nodes connected to the starting node matches a customer descriptor of the customer profile. Processor 112 can then inspect the child nodes of that node to search for another match. Processor 112 can continue moving downward through the descriptor taxonomy until all customer descriptors of the customer profile have been matched to an offering descriptor of a node of the descriptor taxonomy. All matched offering descriptors are stored to as the set of offering descriptors. The set of offering descriptors can be used with step 506 of method 500 or with another method described herein. Processor 112 can perform step 504 using one or more programs of offering recommendation module 140 (FIG. 1). The set of offering descriptors can be stored to, for example, memory 114 of application server 100 (FIG. 1) or another suitable device.

As described previously with respect to the discussion of descriptor taxonomy 252 (FIG. 2), if two or more customer descriptors match the offering descriptors of a particular hierarchical layer of the descriptor taxonomy, processor can inspect the child nodes of all matched nodes of that layer, and continue moving downward through both branches of the descriptor taxonomy. Further, in some examples where no customer descriptors match the offerings of a particular hierarchical layer, processor 112 can continue moving downward through all possible branches of the descriptor taxonomy until processor 112 finds a node having an offering descriptor matching a customer descriptor of the customer profile.

In step 506, a custom set of offerings is generated based on the set of offering descriptors created during step 504. The custom set of offerings are offerings in which the customer is likely to be interested based on the customer descriptors of their customer profile. Processor 112 can query a database that associates offering descriptors and offering with the set of offering descriptors generated in step 504 to generate offerings in which the customer may be interested. Those offerings returned from the query can be stored as the custom set of offerings and used with step 508 of method 500. The database queried in step 506 can be database 172 of database server 104 (FIG. 1) or another suitable database that relates offering descriptors and offerings.

The custom set of offerings generated in step 506 can include the names or titles, offering information, offering documentation, visually-perceptible elements, and/or aurally-perceptible elements for each offering of the custom set of offerings. The visually-perceptible elements can be, for example, one or more photos or videos of the offering, among other options. The aurally-perceptible elements can be, for example, one or more spoken descriptions of the offering, among other options.

In step 508, ecommerce website 162 is updated to display the custom set of offerings. Processor 112 can automatically update a web page of ecommerce website 162 to include one or more visually-perceptible elements and/or aurally-perceptible elements describing the offerings. The visually- and/or aurally-perceptible elements can include offering descriptions, offering names and/or titles, links to offerings description pages, offering documentation, or offering images, among other options.

Ecommerce website 162 is generally configured to be able to present a generic set of offerings to a customer before step 508 is performed. The generic set of offerings are not specific to any particular customer and can be selected based on, for example, overall popularity or another suitable quality. When ecommerce website 162 is updated in step 508, the custom set of offerings are displayed on a web page of ecommerce website 162 instead of the generic set of offerings. As such, updating ecommerce website 162 personalizes the browsing experience of each customer browsing ecommerce website 162.

Processor 112 can use one or more programs to of website modification module 160 to update ecommerce website 162 to display the custom set of offerings. The web page modified in step 508 can be a page for browsing offerings offered on ecommerce website 162. In some examples, ecommerce website can be queried or searched by a customer 186A-N and processor 112 search only the custom set of offerings to provide results to the customer 186A-N.

Like step 502, steps 504 and 506 of method 500 can be performed automatically and concurrently with the collection of electronic customer data used to create the customer profile. As such, the custom set of offerings can be created concurrently and in real-time or substantially real-time as the customer browses ecommerce website 162. Step 508 of method 500 can be performed automatically once step 506 is completed, such that a customer browsing ecommerce website 162 can quickly or, in some examples, immediately presented with an updated web page containing the custom set of offerings. Advantageously, this can improve a customer's browsing experience, potentially increasing the number of purchases made on ecommerce website 162 and increasing the likelihood that the customer will return to ecommerce website 162 to make subsequent or repeat purchases.

Figure 7:
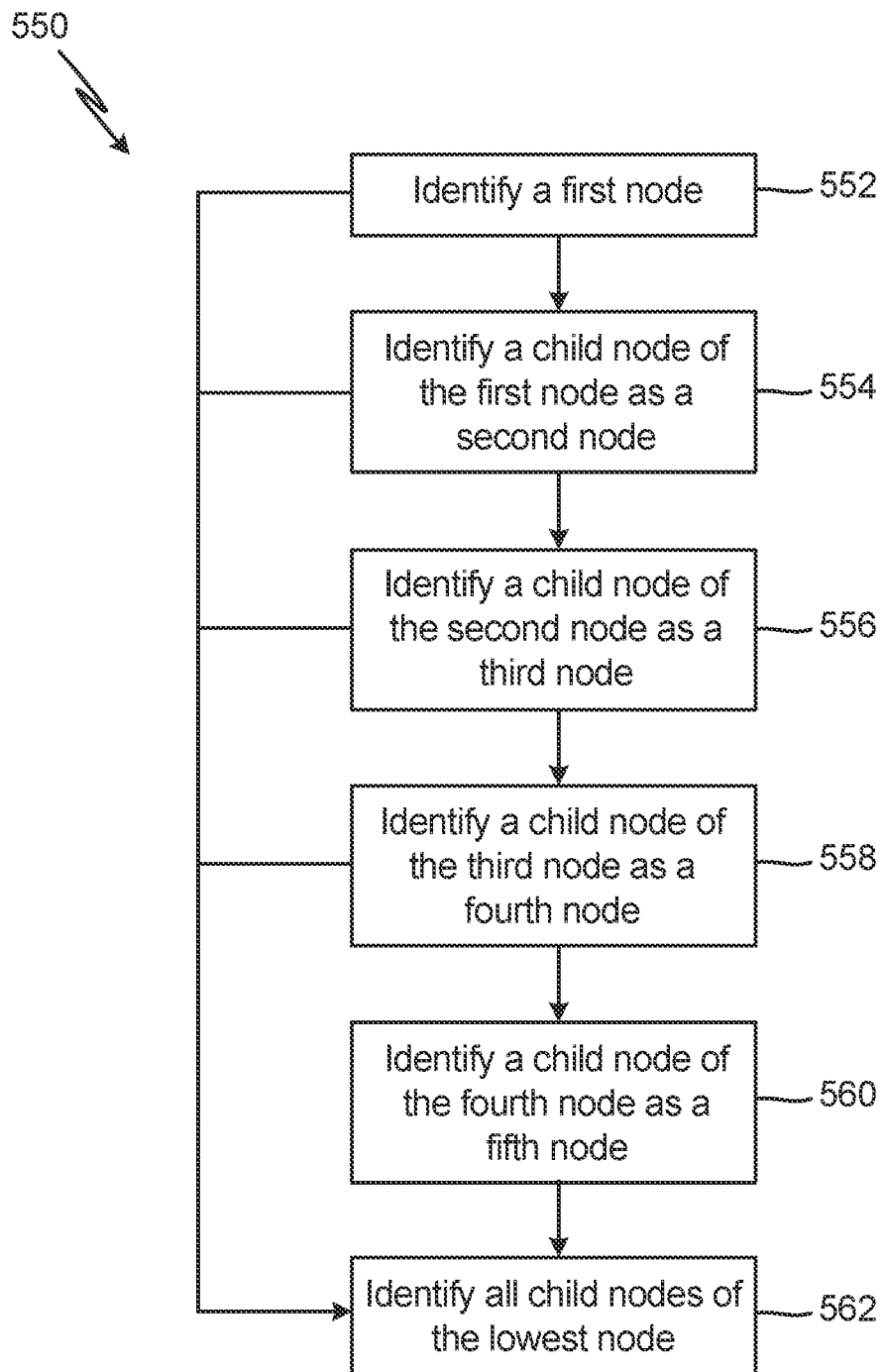
FIG. 7 is a flow diagram of an example of a method of identifying nodes of a descriptor taxonomy based on a customer profile suitable for use with the methods of FIG. 6 and FIG. 8.

FIG. 7 is a flow diagram of method 550, which is a method of identifying nodes of a descriptor taxonomy based on a customer profile. Method 550 can be used to perform step 504 of method 500 and includes steps 552-562 of identifying a first node (step 562), identifying a child node of the first node as a second node (step 564), identifying a child node of the second node as a third node (step 566), identifying a child node of the third node as a fourth node (step 568), identifying a child node of the fourth node as a fifth node (step 560), and identifying all child nodes of the lowest node (step 562).

In step 562, a first node is identified. Processor 112 compares nodes of a descriptor taxonomy in a downward manner, starting from a starting node (e.g., a zero-level node) of the descriptor taxonomy, until processor 112 encounters a node for an offering descriptor corresponding to one of the customer descriptors of the customer profile. The highest node that corresponds to one of the customer descriptors of the customer profile is stored as the first node. The offering descriptor of the first node is stored in the set of offering descriptors for the customer.

In step 554, a child node of the first node is identified as a second node. Processor 112 compares nodes of descriptor taxonomy that are children of the first node and stores the child node at the highest level of the descriptor taxonomy that has an offering descriptor matching or corresponding to a customer descriptor of the customer profile as the second node. In at least some examples, the second node is an immediate child node of the first node. Processor 112 stores the offering descriptor of the second node, as well as the offering descriptors of any nodes intervening between the first and second nodes, in the set of offering descriptors for the customer.

Steps 556-560 are performed in substantially the same manner as step 554, but are performed by inspecting the child nodes of the lowest identified node of the descriptor taxonomy. The lowest node is generally the most-recently identified node and is at the lowest level of the descriptor taxonomy among the identified nodes.

After all customer descriptors have been matched to nodes of the descriptor taxonomy, method 550 proceeds to step 562. In step 562, all child nodes of the lowest node are identified and their respective offering descriptors are stored to the set of offering descriptors. Advantageously, this allows for all descriptors of the child nodes of the identified nodes to also be incorporated into the set of offering descriptors used to, for example, query the database and generate the custom set of offerings in step 506 of method 500.

As indicated by the arrows between steps of method 550, step 562 can be performed after any of steps 552-560 based on when all customer descriptors have been matched to nodes of the descriptor taxonomy. For example, if the customer profile contains only three customer descriptors, method 550 can proceed to step 562 after step 556 and steps 558 and 560 can be omitted from method 550. Further, method 550 can also stop when processor 112 reaches a terminal branch node (i.e., a node having no child nodes) of the descriptor taxonomy. For example, if the descriptor taxonomy only includes four layers of nodes, method 550 can stop after step 558 and steps 560 and 562 can be omitted. In further examples, method 550 can include additional steps to identify nodes lower than the fifth node before all child nodes of the lowest node are identified in step 562.

Method 550 can include additional steps to identify additional nodes (e.g., a sixth, seventh, or eighth node) where descriptor taxonomy has more than five layers of nodes and the customer profile includes descriptors corresponding to more than five layers of the descriptor taxonomy.

In some examples, more than one customer descriptor can match more than one same hierarchical layer of the descriptor taxonomy. In these examples, processor 112 can begin performing additional iterations of method 550 starting at each additional matched node. For example, if two customer descriptors match two nodes that are children of the first node, one node can be treated as the second node of the first instance of method 550 and processor 112 can begin a second instance of method 550 to continue examining child nodes of the second matched node.

While method 550 has been generally described herein with respect to step 506 of method 500, method 550 can also be used to perform step 606 of method 600, discussed subsequently with respect to FIG. 8. Advantageously, method 550 provides a versatile method for exhaustively searching a descriptor taxonomy with a customer profile to identify nodes of the descriptor taxonomy forming a continuous lineage and thereby allowing a set of offering descriptors describing products a customer is likely to be interested in.

Method 550 can be performed by processor 112 concurrently with the collection of electronic customer data used to create the customer profile (e.g., concurrently with step 404 of method 400; FIG. 4). Advantageously, this allows a complex descriptor taxonomy to be thoroughly searched to create a complete set of offering descriptors concurrently or substantially concurrently with the customer's browsing of ecommerce website 162, thereby allowing subsequent steps that use the set of offerings to also be performed concurrently or substantially concurrently with the customer's browsing and further allowing ecommerce website 162 to be quickly or immediately updated or modified based on the customer's likely preferences. As compared to methods that do not use a hierarchical descriptor taxonomy, method 550 and other methods disclosed herein reduce the computational load required to create a custom set of offering descriptors that describe offerings in which a customer is likely to be interested.

Figure 8:
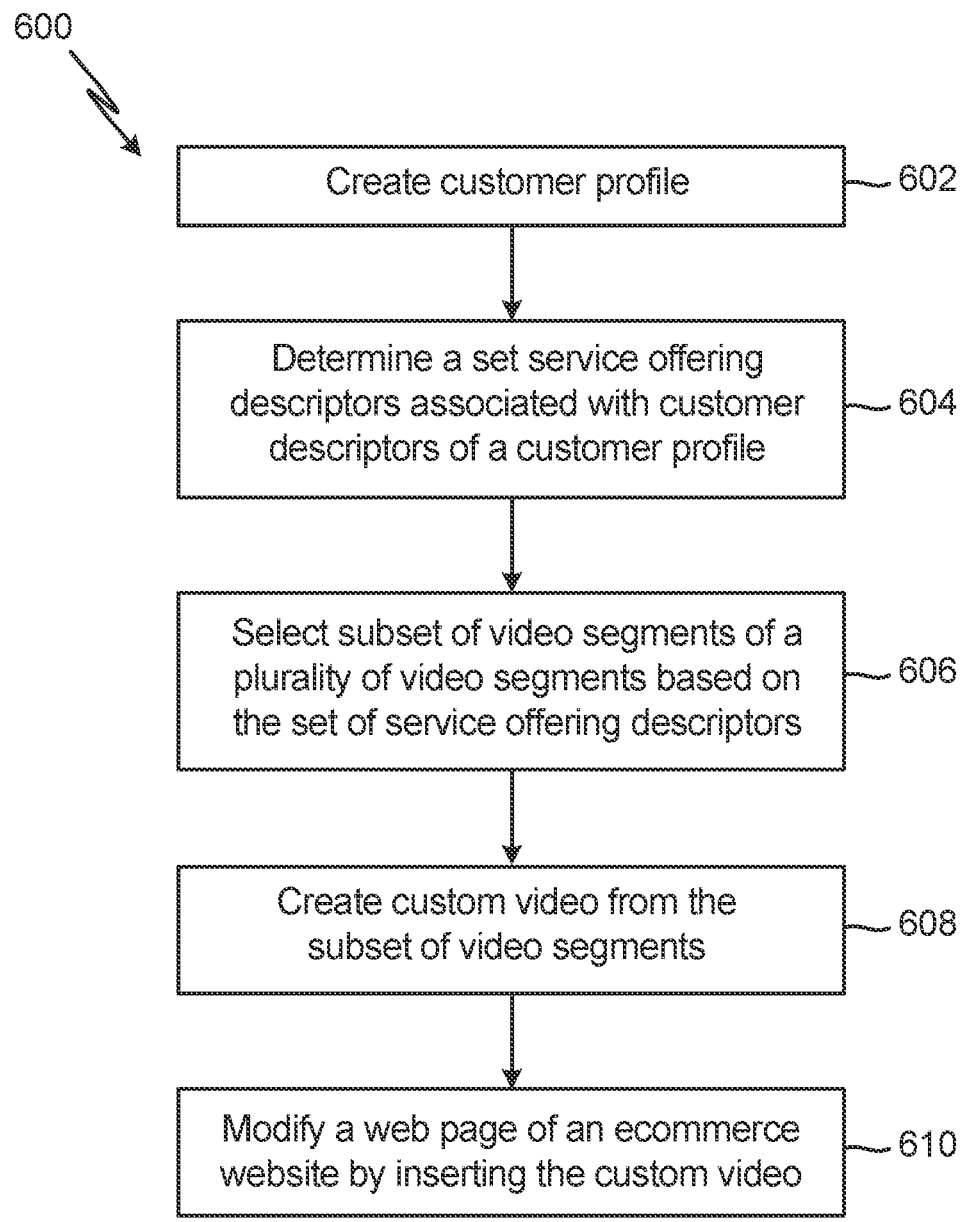
FIG. 8 is a flow diagram of an example of a method of creating a custom video based on a customer profile suitable for use with the web computer system of FIG. 1.

FIG. 8 is a flow diagram of method 600, which is a method of method of creating a custom video based on a customer profile. Method 600 can be used to create custom video 166 of ecommerce website 162 (FIG. 1) and includes steps 602-610 of creating a customer profile (step 602), determining a set of offering descriptors associated with customer descriptors of a customer profile (step 604), selecting a subset of video segments based on the set of offering descriptors (step 606), creating a custom video from the subset of video segments (step 608), and modifying a web page of an ecommerce website by inserting the custom video (step 610). The custom video created using method 600 relates to products described offering descriptors corresponding to customer descriptors, and can be used for advertising or promotional purposes to help motivate a customer to purchase a product on ecommerce website 162.

In step 602, a customer profile is created. The customer profile can be created in the same way as described previously with respect to step 502 of method 500. In some examples, a single customer profile can be created for use with both methods 500 and 600, and one of steps 502 and 602 can be omitted.

In step 604, a set of offering descriptors associated with customer descriptors of the customer profile are determined. Step 604 can be performed in the same way as described previously with respect to step 504 of method 500. In some examples, a single set of offering descriptors can be created for use with both methods 500 and 600, and one of steps 502 and 602 can be omitted.

In step 606, a subset of video segments of a plurality of video segments is selected based on the set of offering descriptors. A database of server system 10, such as database 172 of database server 104, can store a plurality of prerecorded video segments discussing various products and offerings that are offered on ecommerce website 162. The video segments can include one or more of a testimonial, a demonstration, an offering description, or a case study involving the offering, among other options. The database can further relate video segments and offering descriptors, such that querying the database with an offering descriptor can return one or more video segments corresponding to the offering descriptor. Processor 112 can query the database with the set of offering descriptors to determine a subset of the plurality of stored video segments that correspond to the set of offering descriptors. The subset of video segments can then be used with subsequent steps of method 600.

In step 608, a custom video is created from the subset of video segments. Processor 112 can create the custom video by sequencing the subset of video segments. The custom video does not include video segments that do not belong to the subset of video segments. The video segments can be ordered based on likely customer interest, overall relevance to the customer, relatedness to other video segments, or another suitable factor. The custom video can be stored as a file containing the custom video or as a file containing information, pointers, and/or links to the video segments of the custom video, as well as information pertaining the order in which the video segments should be played.

In some examples, the length of the custom video can be limited to be less than a maximum video length. The maximum video length can be selected based on, for example, a maximum time that a customer is likely to watch a video or another suitable customer attribute. In these examples, the subset of video segments selected in step 606 can also be selected based on the length of each video segment, such that the overall length of all video segments in the subset of video segments does not exceed to maximum video length. Further, in some examples, video segments of the overall plurality of video segments may be relevant to more than one offering, and may be more relevant to some offerings than others. The database storing the overall plurality of video segments can include relevance information used to prioritize highly-relevant video segments in a custom video of limited length. Similarly, some video segments of the overall plurality of video segments may be of a much lower quality (e.g., in terms of bitrate, acting, etc.) than other video segments. The database storing the overall plurality of video segments can also include quality information that can be used to prioritize high-quality video segments in a custom video of limited length. Processor 112 can use an optimization algorithm to determine which video segments should be included in a custom video of limited length based on the length of each segment, the relevance of the segment, and/or the quality of the segment.

In step 610, a web page of ecommerce website 162 is modified by inserting the custom video into the web page. Processor 112 can automatically perform step 610 after step 608 is completed, such that the web page is automatically modified once the custom video has been created. Processor 112 can use one or more programs to of website modification module 160 to modify ecommerce website 162 and insert the custom video into a web page. The web page modified in step 610 can be a page for browsing offerings or can be a splash or landing page of ecommerce website 162, among other options.

In some examples, processor 112 can insert the custom video into the web page by inserting a file containing the custom video into the web page. In other examples, processor 112 can insert the custom video into the web page by inserting a link to a file containing the custom video or otherwise embedding the custom video in the web page. In yet further examples, processor 112 can insert the custom video into the web page by inserting pointers to each video segment of the custom video in the web page, as well as instructions that cause the segments to be played back-to-back to appear as a continuous video and to be played in the correct order when viewed.

Steps 602-608 of method 500 can be performed automatically and concurrently with the collection of electronic customer data used to create the customer profile. As such, the custom video can be created concurrently and in real-time or substantially real-time as the customer browses ecommerce website 162. Step 610 of method 600 can be performed automatically once step 608 is completed, such that a customer browsing ecommerce website 162 can quickly or, in some examples, immediately be presented with an updated web page containing the custom video and the customer can watch the custom video during the same browsing session. Advantageously, this can improve a customer's browsing experience, potentially increasing the number of purchases made on ecommerce website 162 and increasing the likelihood that the customer will return to ecommerce website 162 to make subsequent or repeat purchases.

Advantageously, method 600 allows for the automatic creation of a fully custom video that can be presented to a customer in an automatic manner on ecommerce website 162. As compared to existing methods that simply insert a custom video into an otherwise pre-determined video sequence, method 600 provides a solution for creating custom promotion and advertising videos that are tailored to each customer, improving the overall effectiveness of the custom video at motivating customer purchases and further improving the customer's overall browsing experience on an ecommerce website.

The systems and methods disclosed herein advantageously allow for a custom set of offerings and/or a custom video to be created concurrently with a customer's browsing of an ecommerce website. The ecommerce website can then be automatically updated and/or modified to present the custom set of offerings and/or the custom video to the customer shortly after and/or immediately after the customer interacts with the ecommerce website. For if the customer profile is created from customer answers to a questionnaire, the customer can be automatically directed to a web page including the custom video and/or the custom set of offerings immediately following the completion of the questionnaire. Presenting the custom set of offerings and/or the custom set of videos to the customer advantageously can improve the customer's overall browsing experience by allowing for seamless promotion and advertising via delivery of custom videos and further by allowing for the immediate and automatic creation of a tailored set of product recommendations specific to each customer interacting with the ecommerce website.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method of creating custom video sequences, the method comprising:
   presenting an ecommerce website to a customer during a browsing session, the ecommerce website configured to initially display an interactable questionnaire;
   collecting, by a server system, at least one response from the customer to the interactable questionnaire;
   concurrently with collecting the at least one response:
      creating a customer profile of the customer based on the at least one response, the customer profile including at least one customer descriptor;
      determining a first set of offering descriptors based on the at least one customer descriptor using a descriptor taxonomy, wherein:
         the descriptor taxonomy comprises a plurality of nodes arranged in a hierarchical taxonomy;
         each node of the plurality of nodes is associated with an offering descriptor of a plurality of offering descriptors, such that the descriptor taxonomy organizes the plurality of offering descriptors, and wherein each offering descriptor describes aspects of one or more products or services offered for sale; and
         the at least one customer descriptor corresponds to at least one offering descriptor of the plurality of offering descriptors;
      automatically selecting a first subset of video segments from a plurality of video segments based on the set of offering descriptors, wherein selecting the first subset of video segments comprises querying an electronic database storing the plurality of video segments and corresponding segment lengths and segment quality scores for each video segment, wherein the segment quality score is based on a corresponding bitrate of each video segment; and
      automatically sequencing the first subset of video segments into a first custom video by selecting a combination of video segments dependent upon the segment length and the segment quality score of each video segment; and
   automatically modifying a first web page of the ecommerce website during the same browsing session of the customer by inserting instructions into the first web page that, when executed, cause the first web page to display the first custom video having the first subset of video segments.

2. The method of claim 1, and further comprising
   automatically collecting, by the server system, electronic customer data from the ecommerce website after inserting the first custom video, wherein:
      the electronic customer data describes at least one customer interaction with the ecommerce website; and
      the electronic customer data is automatically collected concurrently with the at least one customer interaction;

concurrently with automatically collecting the electronic customer data:
creating an updated customer profile by modifying the customer profile based on the electronic customer data, wherein the updated customer profile comprises at least one updated customer descriptor;
determining a second set of offering descriptors based on the at least one updated customer descriptor;
automatically selecting a second subset of video segments from the plurality of video segments based on the second set of offering descriptors, wherein the second subset of video segments is not identical to the first subset of video segments; and
automatically sequencing the second subset of video segments into a second custom video that is different than the first custom video; and
automatically modifying a second web page of the ecommerce website by inserting the second custom video into the second web page.

3. The method of claim 2, wherein the at least one updated customer descriptor is not identical to the at least one customer descriptor.

4. The method of claim 3, wherein inserting instructions in the first web page further causes the first web page to play the first subset of video segments in a continuous sequence.

5. The method of claim 4, wherein determining the second set of offering descriptors comprises determining the second set of offering descriptors based on the descriptor taxonomy and the at least one updated customer descriptor.

6. The method of claim 5, wherein:
the electronic database relates the plurality of offering descriptors and the plurality of video segments; and
selecting the second subset of video segments comprises querying the electronic database with the second set of offering descriptors.

7. The method of claim 6, wherein:
sequencing the first subset of video segments from the plurality of video segments further comprises selecting a first combination of video segments having a first combined length less than a maximum video sequence length; and
sequencing the second subset of video segments from the plurality of video segments comprises selecting a second combination of video segments having a second combined length less than the maximum video sequence length.

8. The method of claim 7, wherein the maximum video sequence length is selected based on an expected characteristic of the customer.

9. The method of claim 8, wherein:
the interactable questionnaire comprises a plurality of questions;
the interactable questionnaire is displayed by a web page of the ecommerce website; and
the interactable questionnaire is answerable through customer interaction with the ecommerce website.

10. The method of claim 9, wherein each question of the plurality of questions corresponds to one offering descriptor of the plurality of offering descriptors.

11. The method of claim 10, wherein:
the electronic customer data comprises browsing history; and
the browsing history describes browsing of one or more pages of the ecommerce website.

12. The method of claim 11, further comprising creating profiling criteria based on the descriptor taxonomy, wherein:

each criterion of the profiling criteria corresponds to a hierarchical level of the descriptor taxonomy; and
creating the updated customer profile of the customer based on the electronic customer data comprises analyzing the electronic customer data with the profiling criteria to create the at least one updated customer descriptor.

13. The method of claim 12, and further comprising creating the interactable questionnaire based on the profiling criteria.

14. The method of claim 13, wherein:
the profiling criteria comprises a plurality of criteria; and
each question of the plurality of questions corresponds to each criteria of the profiling criteria.

15. The method of claim 14, wherein the at least one updated customer descriptor comprises a first updated customer descriptor and a second updated customer descriptor, and wherein determining the second set of offering descriptors comprises:
identifying a first node of the descriptor taxonomy, wherein:
the first node is associated with a first offering descriptor of the plurality of offering descriptors;
the first offering descriptor corresponds to the first updated customer descriptor; and
the first node is a parent node of one or more first child nodes, the one or more first child nodes defined by the hierarchical taxonomy of the descriptor taxonomy; and
identifying a second node of the descriptor taxonomy, wherein:
the second node is one of the one or more first child nodes of the first node in the hierarchical taxonomy of the descriptor taxonomy;
the second node is associated with a second offering descriptor of the plurality of offering descriptors; and
the second offering descriptor corresponds to the second updated customer descriptor;
wherein the second set of offering descriptors comprises the first offering descriptor and the second offering descriptor.

16. The method of claim 15, wherein:
identifying the first node of the descriptor taxonomy comprises:
comparing the first updated customer descriptor to the plurality of offering descriptors; and
identifying the first node based on the results of the comparison; and
identifying the second node of the descriptor taxonomy comprises:
comparing the second customer updated descriptor to offering descriptors of the plurality of offering descriptors associated with the one or more first child nodes of the first node; and
identifying the second node based on the results of the comparison.

17. A system for creating custom video sequences, the system comprising:
a webserver;
an ecommerce website hosted by the webserver;
an application server in electronic communication with the webserver, the application server comprising:
a processor; and
computer-readable memory encoded with instructions that, when executed, cause the processor to:

present the ecommerce website to a customer during a browsing session, the ecommerce website configured to initially display an interactable questionnaire;
collect at least one response from the customer to the interactable questionnaire;
concurrently with collection of the at least one response:
  create a customer profile of the customer based on the at least one response, the customer profile including at least one customer descriptor;
  determine a first set of offering descriptors based on the at least one customer descriptor using a descriptor taxonomy, wherein:
    the descriptor taxonomy comprises a plurality of nodes arranged in a hierarchical taxonomy;
    each node of the plurality of nodes is associated with an offering descriptor of a plurality of offering descriptors, such that the descriptor taxonomy organizes the plurality of offering descriptors, and wherein each offering descriptor describes aspects of one or more products or services offered for sale; and
    the at least one customer descriptor corresponds to at least one offering descriptor of the plurality of offering descriptors;
  automatically select a first subset of video segments from a plurality of video segments based on the set of offering descriptors, wherein the selection of the first subset of video segments comprises querying an electronic database storing the plurality of video segments and corresponding segment lengths and segment quality scores for each video segment, wherein a segment quality score is based on a corresponding bitrate of each video segment; and
  automatically sequence the first subset of video segments into a first custom video by selecting a combination of video segments dependent upon the segment length and the segment quality score of each video segment; and
  automatically modify a first web page of the ecommerce website during the same browsing session of the customer by inserting second instructions into the first web page that, when executed, cause the first web page to display the first custom video having the first subset of video segments.

18. The system of claim 17, wherein the instructions that, when executed, further cause the processor to:
automatically collect electronic customer data from the ecommerce website after inserting the first custom video, wherein:
  the electronic customer data describes at least one customer interaction with the ecommerce website; and
  the electronic customer data is automatically collected concurrently with the at least one customer interaction;
concurrently with automatic collection of the electronic customer data:
  create an updated customer profile by modifying the customer profile based on the electronic customer data, wherein the updated customer profile comprises at least one updated customer descriptor;
  determine a second set of offering descriptors based on the at least one updated customer descriptor;
  automatically select a second subset of video segments from the plurality of video segments based on the second set of offering descriptors, wherein the second subset of video segments is not identical to the first subset of video segments; and
  automatically sequence the second subset of video segments into a second custom video; and
automatically modify a second web page of the ecommerce website by inserting the second custom video into the second web page.

* * * * *